United States Patent
Xue et al.

(10) Patent No.: US 11,570,811 B2
(45) Date of Patent: Jan. 31, 2023

(54) CONTENTION WINDOW MANAGEMENT FOR GROUP LISTEN BEFORE TALK BASED CHANNEL ACCESS

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 16/995,644

(22) Filed: Aug. 17, 2020

(65) Prior Publication Data

US 2021/0058968 A1 Feb. 25, 2021

Related U.S. Application Data

(60) Provisional application No. 62/888,881, filed on Aug. 19, 2019.

(51) Int. Cl.
| | |
|---|---|
| *H04W 74/08* | (2009.01) |
| *H04W 74/00* | (2009.01) |
| *H04W 24/08* | (2009.01) |
| *H04L 1/18* | (2006.01) |
| *H04L 5/00* | (2006.01) |
| *H04W 72/04* | (2009.01) |

(52) U.S. Cl.
CPC ....... *H04W 74/0808* (2013.01); *H04L 1/1819* (2013.01); *H04L 5/0055* (2013.01); *H04W 24/08* (2013.01); *H04W 72/0446* (2013.01); *H04W 74/008* (2013.01)

(58) Field of Classification Search
None
See application file for complete search history.

(56) References Cited

U.S. PATENT DOCUMENTS

| | | | |
|---|---|---|---|
| 2015/0373485 A1* | 12/2015 | Chung | H04W 48/10 455/41.2 |
| 2018/0014596 A1* | 1/2018 | Washington | A42B 1/0182 |
| 2018/0124834 A1 | 5/2018 | Salem et al. | |
| 2018/0249484 A1 | 8/2018 | Kim et al. | |

(Continued)

OTHER PUBLICATIONS

International Search Report and Written Opinion—PCT/US2020/046797—ISA/EPO—dated Nov. 4, 2020 (194286WO).

*Primary Examiner* — Rebecca E Song
(74) *Attorney, Agent, or Firm* — Holland & Hart LLP

(57) ABSTRACT

Methods, systems, and devices for wireless communications are described. A base station may identify a listen-before-talk (LBT) procedure to use for transmitting a downlink signal to a user equipment (UE) on a shared radio frequency spectrum band. The LBT procedure may be a group LBT procedure associated with a first set of contention window durations or an individual listen-before talk procedure associated with a second set of contention window durations. The base station may determine a contention window duration corresponding to the identified LBT procedure, perform the identified LBT procedure using the determined contention window duration, and transmit the downlink signal to the UE based on the performed LBT procedure.

28 Claims, 18 Drawing Sheets

(56) References Cited

U.S. PATENT DOCUMENTS

2019/0044751 A1\* 2/2019 Du ................... H04L 12/413
2020/0037359 A1\* 1/2020 Wang ............... H04W 74/0808
2020/0045734 A1\* 2/2020 Park ................. H04W 72/0446

\* cited by examiner

CONTENTION WINDOW MANAGEMENT FOR GROUP LISTEN BEFORE TALK BASED CHANNEL ACCESS

CROSS REFERENCE

The present Application for Patent claims the benefit of U.S. Provisional Patent Application No. 62/888,881 by XUE et al., entitled "CONTENTION WINDOW MANAGEMENT FOR GROUP LISTEN BEFORE TALK BASED CHANNEL ACCESS," filed Aug. 19, 2019, assigned to the assignee hereof, and expressly incorporated by reference herein.

BACKGROUND

The present disclosure relates generally to wireless communications, and more specifically to contention window management for group listen-before-talk (LBT) based channel access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). One or more base stations in the wireless communications system may be capable of performing group LBT procedures in coordination with other base stations to operate in unlicensed or shared licensed radio frequency (RF) spectrum bands also used by other wireless devices. The base stations may further be capable of performing individual LBT procedures. Contention window management may affect group and individual LBT procedure success.

SUMMARY

The described techniques relate to improved methods, systems, devices, and apparatuses that support contention window management for group listen-before-talk (LBT) channel access. One or more base stations may perform group LBT procedures in a wireless communications system (e.g., a new radio unlicensed (NR-U) system). Group LBT procedures may increase transmission capacity at the base stations and improve user experience. A group LBT procedure may include multiple base stations (e.g., a set of base stations corresponding to an operator) synchronously accessing a shared radio frequency channel. One or more base stations may perform contention window management to successfully utilize group LBT procedures in a variety of scenarios. Contention window management may include determining contention window durations for base stations that may perform both individual and group LBT procedures, determining contention window durations for co-existence between operators and different base stations using individual or group LBT procedures, improving fairness in channel access, utilizing a common clock, or the like.

In some cases, a base station may contend for access to a shared radio frequency spectrum band with one or more other base stations. The base station may determine an LBT procedure (e.g., an individual or group LBT procedure), and one or more contention window durations may correspond to each LBT type. The base station may determine a contention window duration based on the identified LBT procedure. A base station may select a contention window duration from independent sets of contention window durations based on whether it determines to perform a group LBT procedure or an individual LBT procedure. In some examples, the base station may select a contention window duration based on an LBT priority class corresponding to a pending downlink transmission and a determined LBT procedure. The base station may then perform the LBT procedure using the determined contention window duration (e.g., by selecting a random number from within the determined contention window duration). If the LBT procedure is successful, the base station 105 may transmit a downlink signal to a user equipment (UE) on the shared radio frequency spectrum band.

A method of wireless communications at a base station is described. The method may include identifying a LBT procedure to use to transmit a downlink signal to a UE on a shared radio frequency spectrum band, the LBT procedure including one of a group LBT procedure associated with a first set of contention window durations or an individual listen-before talk procedure associated with a second set of contention window durations, determining a contention window duration corresponding to the identified LBT procedure, performing the identified LBT procedure using the determined contention window duration, and transmitting the downlink signal to the UE on the shared radio frequency spectrum band based on the performed LBT procedure.

An apparatus for wireless communications at a base station is described. The apparatus may include a processor, memory coupled with the processor, and instructions stored in the memory. The instructions may be executable by the processor to cause the apparatus to identify a LBT procedure to use to transmit a downlink signal to a UE on a shared radio frequency spectrum band, the LBT procedure including one of a group LBT procedure associated with a first set of contention window durations or an individual listen-before talk procedure associated with a second set of contention window durations, determine a contention window duration corresponding to the identified LBT procedure, perform the identified LBT procedure using the determined contention window duration, and transmit the downlink signal to the UE on the shared radio frequency spectrum band based on the performed LBT procedure.

Another apparatus for wireless communications at a base station is described. The apparatus may include means for identifying a LBT procedure to use to transmit a downlink signal to a UE on a shared radio frequency spectrum band, the LBT procedure including one of a group LBT procedure associated with a first set of contention window durations or an individual listen-before talk procedure associated with a second set of contention window durations, determining a contention window duration corresponding to the identified LBT procedure, performing the identified LBT procedure using the determined contention window duration, and transmitting the downlink signal to the UE on the shared radio frequency spectrum band based on the performed LBT procedure.

A non-transitory computer-readable medium storing code for wireless communications at a base station is described. The code may include instructions executable by a processor to identify a LBT procedure to use to transmit a downlink signal to a UE on a shared radio frequency spectrum band, the LBT procedure including one of a group LBT procedure associated with a first set of contention window durations or an individual listen-before talk procedure associated with a second set of contention window durations, determine a contention window duration corresponding to the identified LBT procedure, perform the identified LBT procedure using the determined contention window duration, and transmit the downlink signal to the UE on the shared radio frequency spectrum band based on the performed LBT procedure.

Some examples of the method, apparatuses, and non-transitory computer-readable medium described herein may further include operations, features, means, or instructions for identifying an LBT priority class associated with the downlink signal, the contention window duration determined based on the identified LBT priority class.

In some examples of the method, apparatuses, and non-transitory computer-readable medium described herein, each contention window duration of the first and second sets of contention window durations correspond to a respective LBT priority class of a set of LBT priority classes, and determining the contention window duration may include operations, features, means, or instructions for selecting a contention window duration from one of the first set of contention window durations or the second set of contention window durations based on the identified LBT procedure and the identified LBT priority class.

In some examples of the method, apparatuses, and non-transitory computer-readable medium described herein, the contention window duration corresponds to a common contention window duration corresponding to the set of LBT priority classes including the identified LBT priority class, where determining the contention window duration may be based on the common contention window duration and identifying the LBT priority class.

Some examples of the method, apparatuses, and non-transitory computer-readable medium described herein may further include operations, features, means, or instructions for identifying a set of contention window durations, determining the first set of contention window durations from the set of contention window durations based on a first set of rules for the group LBT procedure, and determining the second set of contention window durations from the set of contention window durations based on a second set of rules for the individual LBT procedure.

Some examples of the method, apparatuses, and non-transitory computer-readable medium described herein may further include operations, features, means, or instructions for receiving, from a network device, an indication of a common contention window duration, where the first set of contention window durations includes the common contention window duration.

In some examples of the method, apparatuses, and non-transitory computer-readable medium described herein, performing the identified LBT procedure using the determined contention window duration may include operations, features, means, or instructions for performing the group LBT procedure, determining that the group LBT procedure may have failed, waiting for a first backoff period according to the common contention window duration to perform a second group LBT procedure, performing the second group LBT procedure, determining that the second group LBT procedure may have failed, and waiting for a second backoff period according to the common contention window duration to perform a third group LBT procedure.

In some examples of the method, apparatuses, and non-transitory computer-readable medium described herein, performing the identified LBT procedure using the determined contention window duration may include operations, features, means, or instructions for performing the group list-before-talk procedure, determining that the group LBT procedure may have failed, waiting for a first backoff period based on the common contention window duration to perform a second group LBT procedure, performing the second group LBT procedure, determining that the second group LBT procedure may have failed, increasing the common contention window duration by a predetermined factor, and waiting for a second backoff period according to the incremented common contention window duration to perform a third group LBT procedure.

Some examples of the method, apparatuses, and non-transitory computer-readable medium described herein may further include operations, features, means, or instructions for increasing the common contention window duration by the predetermined factor after each failed group—LBT procedure of a first set of consecutive failed group LBT procedures until the incremented common contention window duration may be greater than or equal to a maximum contention window duration, performing a second set of consecutive failed group LBT procedures until the number of consecutive failed group LBT procedures satisfies a threshold number of failed group LBT procedures, and resetting the contention window duration based on the threshold number of failed group LBT procedures.

In some examples of the method, apparatuses, and non-transitory computer-readable medium described herein, resetting the contention window duration further may include operations, features, means, or instructions for setting the reset contention window duration equal to a contention window minimum duration.

In some examples of the method, apparatuses, and non-transitory computer-readable medium described herein, resetting the contention window duration further may include operations, features, means, or instructions for setting the reset contention window duration equal to the common contention window duration.

In some examples of the method, apparatuses, and non-transitory computer-readable medium described herein, the one or more common contention window durations may be based on a duty cycle threshold duration.

Some examples of the method, apparatuses, and non-transitory computer-readable medium described herein may further include operations, features, means, or instructions for receiving, from a network device, an indication of a set of common contention window durations, where the first set of contention window durations includes the set of common contention window durations, where each common contention window duration of the set of common contention window durations corresponds to respective LBT priority classes of a set of LBT priority classes, the method further including.

In some examples of the method, apparatuses, and non-transitory computer-readable medium described herein, determining the contention window duration corresponding to the identified LBT procedure further may include operations, features, means, or instructions for identifying, for the first set of contention window durations, an offset duration for the contention window duration, and selecting a random or pseudo-random number from the sum of the contention window duration and the offset duration.

In some examples of the method, apparatuses, and non-transitory computer-readable medium described herein, determining the contention window duration corresponding to the identified LBT procedure further may include operations, features, means, or instructions for identifying, for the first set of contention window durations, a minimum random duration based on the first set of contention window durations, selecting a first random number from within the contention window duration, and comparing the selected random number with the minimum random duration.

Some examples of the method, apparatuses, and non-transitory computer-readable medium described herein may further include operations, features, means, or instructions for determining, based on the comparing, that the selected random number may be less than the minimum random duration, and selecting a second random number from within the contention window duration.

Some examples of the method, apparatuses, and non-transitory computer-readable medium described herein may further include operations, features, means, or instructions for determining, based on the comparing, that the selected random number may be less than the minimum random duration, and selecting the minimum random duration instead of the selected random number.

In some examples of the method, apparatuses, and non-transitory computer-readable medium described herein, identifying a LBT procedure further may include operations, features, means, or instructions for refraining, based on the identifying the group LBT procedure, from conducting a hybrid automatic repeat request (HARQ) acknowledgement (ACK) procedure.

Some examples of the method, apparatuses, and non-transitory computer-readable medium described herein may further include operations, features, means, or instructions for determining that each base station of a set of base stations using the shared radio frequency spectrum band may be participating in the identified group LBT procedure, where the refraining may be based on the determining that each base station may be participating in the identified group LBT procedure.

Some examples of the method, apparatuses, and non-transitory computer-readable medium described herein may further include operations, features, means, or instructions for identifying a common clock timing for a set of base stations communicating on the shared radio frequency spectrum band, determining, based on the common clock timing, a set of time periods during which to transmit on the shared radio frequency spectrum band, selecting a first time period of the set of time periods, and sending a downlink transmission on the shared radio frequency spectrum band during the selected time period.

In some examples of the method, apparatuses, and non-transitory computer-readable medium described herein, each time period of the set of time periods may be associated with the contention window duration and where selecting the time period may be based on determining a contention window duration.

In some examples of the method, apparatuses, and non-transitory computer-readable medium described herein, each time period of the set of time periods may be associated priority level, where selecting the time period may be based on an LBT priority class associated with the identified LBT procedure.

A method of wireless communications at a UE is described. The method may include identifying a common clock timing for a set of base stations communicating on a shared radio frequency spectrum band, determining, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station, monitoring for downlink signals from the base station according to the determined set of time periods, and receiving a downlink signal from the base station during one or more of the set of time periods based on based on the monitoring.

An apparatus for wireless communications at a UE is described. The apparatus may include a processor, memory coupled with the processor, and instructions stored in the memory. The instructions may be executable by the processor to cause the apparatus to identify a common clock timing for a set of base stations communicating on a shared radio frequency spectrum band, determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station, monitor for downlink signals from the base station according to the determined set of time periods, and receive a downlink signal from the base station during one or more of the set of time periods based on based on the monitoring.

Another apparatus for wireless communications at a UE is described. The apparatus may include means for identifying a common clock timing for a set of base stations communicating on a shared radio frequency spectrum band, determining, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station, monitoring for downlink signals from the base station according to the determined set of time periods, and receiving a downlink signal from the base station during one or more of the set of time periods based on based on the monitoring.

A non-transitory computer-readable medium storing code for wireless communications at a UE is described. The code may include instructions executable by a processor to identify a common clock timing for a set of base stations communicating on a shared radio frequency spectrum band, determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station, monitor for downlink signals from the base station according to the determined set of time periods, and receive a downlink signal from the base station during one or more of the set of time periods based on based on the monitoring.

In some examples of the method, apparatuses, and non-transitory computer-readable medium described herein, each time period of the set of time periods corresponds to an operator.

In some examples of the method, apparatuses, and non-transitory computer-readable medium described herein, each time period of the set of time periods corresponds to an LBT priority class.

Some examples of the method, apparatuses, and non-transitory computer-readable medium described herein may further include operations, features, means, or instructions for monitoring for periodic control signaling according to a control periodicity, and receiving control signals based on the monitoring.

DETAILED DESCRIPTION

Figure 1:
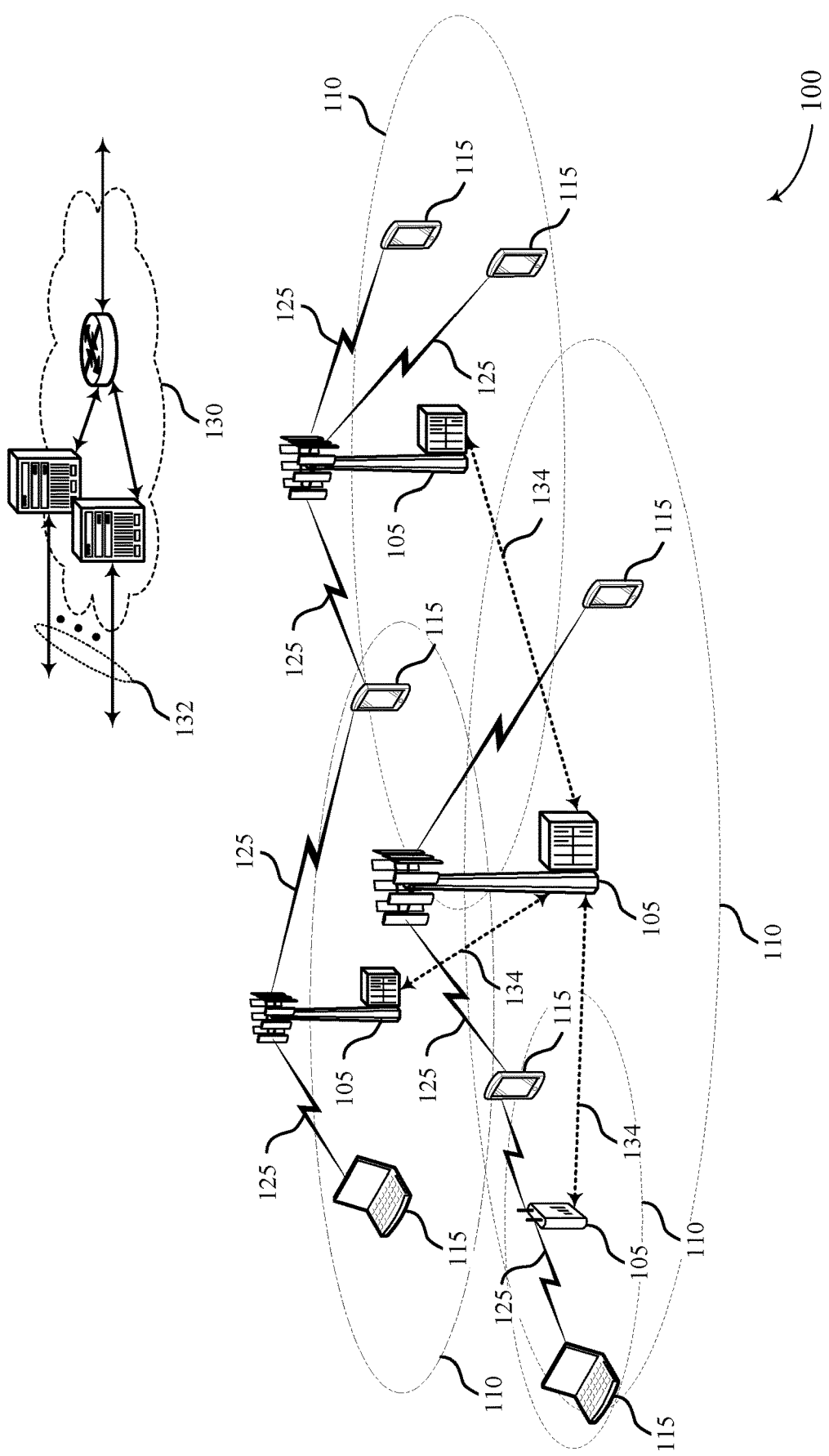
FIG. 1 illustrates an example of a system for wireless communications that supports contention window management for group listen-before-talk (LBT) based channel access in accordance with aspects of the present disclosure.

In some examples of a wireless communications system (e.g., new radio unlicensed (NR-U)) base stations may conduct per-node listen-before-talk (LBT) procedures for channel access. LBT mechanisms may be improved from conventional techniques as a result of backhaul signaling, high accuracy synchronization among nodes, and rich interference management tools. But, per-node LBT procedures prevent capable operators from fully exploiting potential unlicensed (e.g., or shared licensed) spectrum. Group LBT procedures may improve user experience by synchronously accessing a channel. Group LBT procedures may allow multiple gNBs of an operator to compete in parallel for a channel occupancy time (COT) (e.g., using a category 4 LBT). A first base station (e.g., a leading base station) gains access, and arranges LBT occasions (e.g., category 2 LBT occasions) to share the COT with other gNBs. Contention window duration management (e.g., for category 4 LBT procedures) may address co-existence scenarios including single-node LBT procedures and group LBT procedures, instability of LBT procedures (e.g., category 4 LBT procedures), and common clock scenarios.

In some examples of wireless communication, multiple devices may communicate using unlicensed or shared licensed spectrum. For instance, one or more base stations may contend for access to a shared radio frequency spectrum band. In some examples (e.g., in new radio unlicensed (NR-U)), a base station may be capable of performing an individual listen-before-talk (LBT) procedure or a group LBT procedure to gain access to the shard radio frequency spectrum band.

In some examples, individual LBT procedures (e.g., per-node LBT procedures) to gain channel access may limit the ability of some operators to fully exploit the potential of unlicensed spectrum. For instance, individual LBT procedures may not deploy advanced multiple antenna techniques. In some examples of wireless communication (e.g., an NR-U system) a base station may be capable of using a simple antenna model with a limited number of antennas in comparison with a base station using operating in licensed spectrum. Individual LBT procedures may not use any coordinated multi-point (CoMP) techniques despite efficient backhaul and fronthaul signaling. As such, performing individual LBT procedures may result in a base station being unable to provide high quality of service guarantees in comparison with communications in an NR system using licensed spectrum.

Alternatively, one or more base stations may perform group LBT procedures in a wireless communications system (e.g., an NR-U system). Group LBT procedures may increase transmission capacity at the base stations and improve user experience. A group LBT procedure may include multiple base stations (e.g., a set of base stations corresponding to an operator) that may synchronously access a shared radio frequency channel. For example, several base stations from the same operator may be arranged to compete, in parallel, for a channel occupancy time (COT) using a category 4 LBT procedure (e.g., an LBT procedure having a random (or other) back-off period and a variable sized contention window). The first base station of the competing base stations to gain access to the channel and check out a COT may assume the role of a leading base station. The leading base station may share the COT with the other competing base stations. For example, the leading base stations may arrange one or more occasions for performing category 2 LBT procedures (e.g., an LBT having one-time channel sensing for a fixed period without a back-off period), and may refrain from transmitting during the category 2 LBT occasions. The other competing base stations may then attempt to join the COT by performing category 2 LBT procedures during the arranged category 2 LBT occasions.

One or more base stations may perform contention window management to successfully utilize group LBT procedures in a variety of scenarios. For instance, a base station may perform a group LBT procedure at a first time and an individual LBT procedure at a second time. The base station may manage such variations by implementing contention window management (e.g., by selecting an appropriate contention window duration for the different types of LBT procedures). In some cases, category 4 LBT procedure may be unstable, and a base station may be unable to guarantee high quality of service. For example, category 4 LBT procedures may result in a device that is perpetually unable to gain access to the channel. However, by managing contention window durations for group LBT procedures, this instability may be addressed. In some examples, one operator corresponding to a first set of base stations may perform group LBT procedures and another operator corresponding to a second set of base stations may perform individual or conventional LBT procedures. Such coexistence may be addressed by performing contention window duration management. In some examples, all base stations competing for access to the channel may share a common clock. Base stations may select contention window durations according to the common clock. In each of the above mentioned scenarios, a base station may improve user experience and system efficiency by selecting an appropriate contention window value (e.g., according to a set of one or more rules, based on an LBT type, based on an LBT priority class, as indicated by the network, or any combination thereof).

Aspects of the disclosure are initially described in the context of wireless communications systems. Aspects of the disclosure are further described in the context of LBT procedures, process flows, and timelines. Aspects of the disclosure are further illustrated by and described with reference to apparatus diagrams, system diagrams, and flowcharts that relate to contention window management for group LBT based channel access.

FIG. 1 illustrates an example of a wireless communications system 100 that supports contention window management for group LBT based channel access in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Devices in wireless communications system 100 may communicate over unlicensed spectrum such as the 5 GHz band, the 2.4 GHz band, the 60 GHz band, the 3.6 GHz band, and/or the 900 MHz band. The unlicensed spectrum may also include other frequency bands.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a base station 105 may identify an LBT procedure to use for transmitting a downlink signal to a UE 115 on a shared radio frequency spectrum band. The LBT procedure may be a group LBT procedure associated with a first set of contention window durations or an individual listen-before talk procedure associated with a second set of contention window durations. The base station 105 may determine a contention window duration corresponding to the identified LBT procedure, perform the identified LBT procedure using the determined contention window duration, and transmit the downlink signal to the UE 115 based on the performed LBT procedure. An advantage of these techniques may be improved exploitation of available shared resources at a base station, improved system efficiency, and improved user experience.

In some cases, a base station 105 may identify an LBT priority class associated with the downlink signal, and may select a contention window duration from the first set of contention window durations or the second set of contention window durations based on the identified LBT procedure and the identified LBT priority class. An advantage of these techniques may be improved exploitation of available shared resources at a base station, improved system efficiency, and improved user experience.

In some cases, a base station 105 may identify a set of contention window durations, determine the first set of contention window durations from the set of contention windows (e.g., corresponding to group LBT procedures) based on a first set of rules for the group LBT procedures (e.g., manipulating a common contention window duration) and determine the second set of contention window durations from the set of contention windows (e.g., corresponding to individual LBT procedures) based on a second set of rules for the individual LBT procedure (e.g., manipulating different or refraining from manipulating the common contention window duration). An advantage of these techniques may be improved exploitation of available shared resources at a base station, improved system efficiency, and improved user experience.

Figure 2:
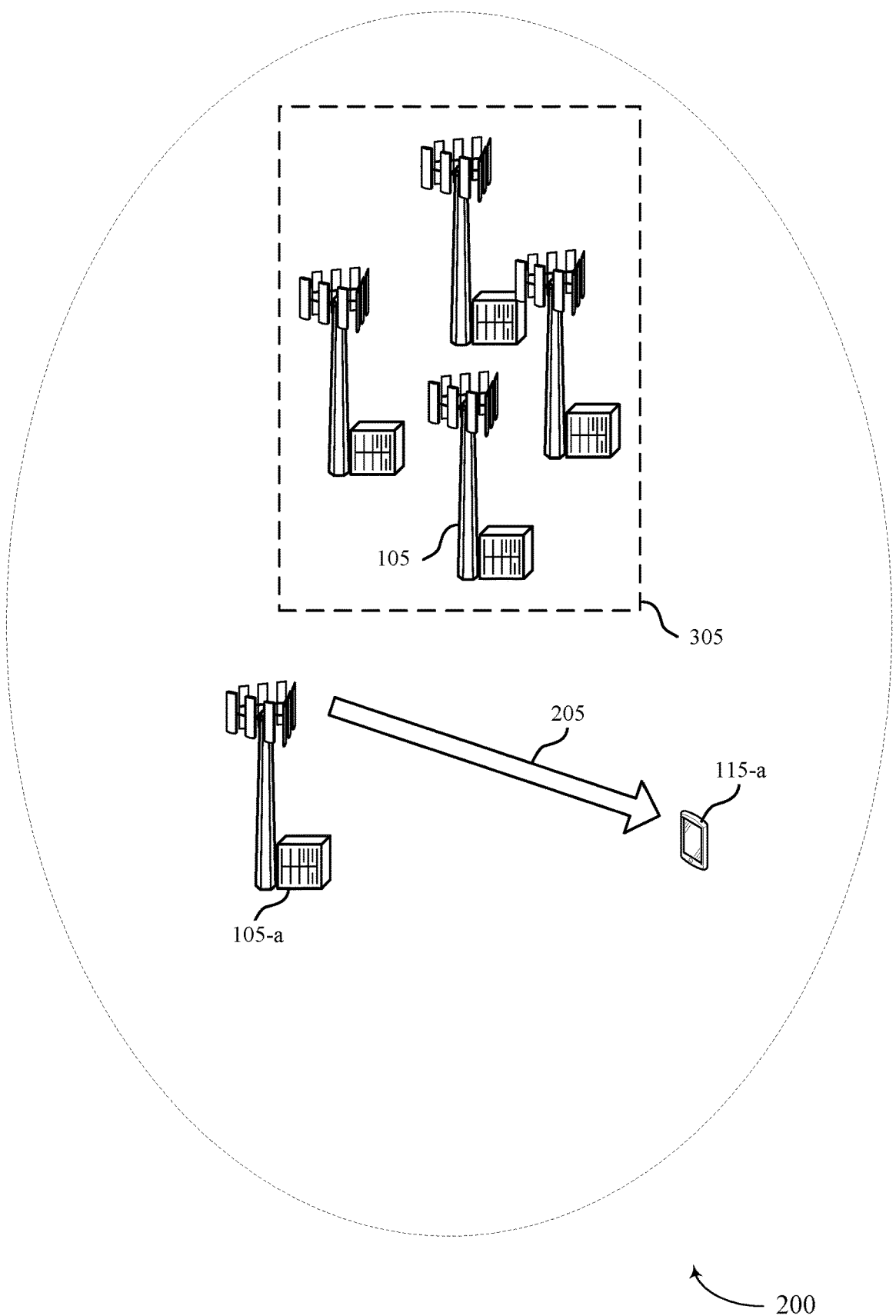
FIG. 2 illustrates an example of a wireless communications system that supports contention window management for group LBT based channel access in accordance with aspects of the present disclosure.

FIG. 2 illustrates an example of a wireless communications system 200 that supports contention window management for group LBT based channel access in accordance with aspects of the present disclosure. In some examples, wireless communications system 200 may implement aspects of wireless communications system 100.

In some examples of wireless communication, multiple devices may communicate using a shard radio frequency spectrum band (e.g., unlicensed channel 205). For instance, a base station 105-a may have pending data to send to a UE 115-a via an unlicensed channel 205. Base station 105-a may contend individually for access to the unlicensed channel 205. However, in some examples, base station 105-a may be capable of performing an individual listen-before-talk (LBT) procedure or a group LBT procedure to gain access to the unlicensed channel 205. That is, base station 105-a may perform a group LBT procedure with group 210 of base stations 105, as described in greater detail below.

LBT procedures may promote fairness. Some LBT procedures may be similar to conventional clear channel assessment procedures, but wireless communications system 200 may provide advantages. For instance, base stations 105 in a wireless system (e.g., an NR-U system) may have improved backhaul over previous or conventional systems. Base stations 105 may support high-accuracy synchronization among nodes, and may provide a rich set of interference management tools (e.g., CSI measurement and reporting).

Individual LBT procedures (e.g., per-node or per base station LBT procedures) to gain channel access may limit the ability of some operators to fully exploit the potential of unlicensed spectrum and the benefits of operating in unlicensed or shared spectrum. That is, a first group of one or more base stations may correspond to a first operator, and a second group of one or more base stations may correspond to a second operator. The first group of one or more base stations may more efficiently utilize shared or partially shared spectrum by coordinating and performing group LBT procedures while competing for access with the second group of base stations. Individual LBT procedures may not as efficiently use available shared spectrum. For instance, individual LBT procedures may not deploy advanced multiple antenna techniques. In some examples of wireless communication (e.g., an NR-U system) a base station may be capable of using a simple antenna model with a limited number of antennas in comparison with a base station using operating in licensed spectrum. Individual LBT procedures may not use any coordinated multi-point (CoMP) techniques despite efficient backhaul and fronthaul signaling. Alternatively, base station 105-a may perform group LBT procedures with group 210 of base station 105 in a wireless communications system (e.g., NR-U). Group LBT procedures may increase transmission capacity at the base stations and improve user experience. A group LBT procedure may include multiple base stations (e.g., a set of base stations corresponding to an operator) may synchronously access a shared radio frequency channel. For example, several base stations 105 from the same operator may be arranged to compete, in parallel, for a channel occupancy time (COT) using an LBT procedure.

In some implementations, there may be different categories of LBT procedures, including category 1 LBT (i.e., no LBT), category 2 LBT (i.e., LBT including one-time channel sensing for a fixed period without a back-off period), category 3 LBT (i.e., LBT with a random (or other) back-off period and a fixed sized contention window), and category 4 LBT (i.e., LBT with a random (or other) back-off period and a variable sized contention window). In some cases, a category 2 LBT procedure may be referred to as a one-time LBT procedure where a UE 115 may perform channel sensing for a defined duration (e.g., 25 µs). Further, a category 4 LBT procedure may be referred to as a fairness-based LBT procedure for performing channel sensing with a backoff, where the backoff may be used to prevent a UE from accessing a channel immediately after detecting that the channel is clear.

To perform a group LBT procedure, base station 105-a may perform a category 4 LBT procedure (e.g., an LBT procedure having a random (or other) back-off period and a variable sized contention window). The first base station 105 of the competing base stations 105 to gain access to unlicensed channel 205 and check out a COT may assume the role of a leading base station 105. If base station 105-a is the leading base station, then base station 105-a may share the COT with the other competing base stations 105 of group 210. For example, the base station 105-a may arrange one or more occasions for performing category 2 LBT procedures (e.g., LBT procedure having one-time channel sensing for a fixed period without a back-off period), and may refrain from transmitting during the category 2 LBT occasions. The other competing base stations 105 may then attempt to join the COT by performing category 2 LBT procedures during the arranged category 2 LBT occasions.

One or more base stations 105 may perform contention window management to successfully utilize group LBT procedures in a variety of scenarios. For instance, base station 105-a may perform a group LBT procedure at a first instant in time and an individual LBT procedure at a second instant in time. Base station 105-a may manage such variations by implementing contention window management (e.g., by selecting an appropriate contention window duration for the different types of LBT procedures). In some cases, category 4 LBT procedure may be unstable, and a base station 105 may be unable to guarantee high quality of service. That is, category 4 LBT procedures may result in a device that is perpetually unable to gain access to the unlicensed channel 205. However, by managing contention window durations for group LBT procedures as described in greater detail herein, this instability may be addressed. In some examples, one operator corresponding to a first set of base stations 105 may perform group LBT procedures and another operator corresponding to a second set of base stations 105 may perform individual or conventional LBT procedures. Such coexistence may be addressed by performing contention window duration management to ensure fairness across operators. In some examples, base stations 105 competing for access to the unlicensed channel 205 may share a common clock. Base stations 105 may select contention window durations to exploit the common clock. In each of the above mentioned scenarios, a base station 105 may improve user experience and system efficiency by selecting an appropriate contention window value (e.g., according to a set of one or more rules, based on an LBT type, based on an LBT priority class, as indicated by the network, or any combination thereof).

Figure 3:
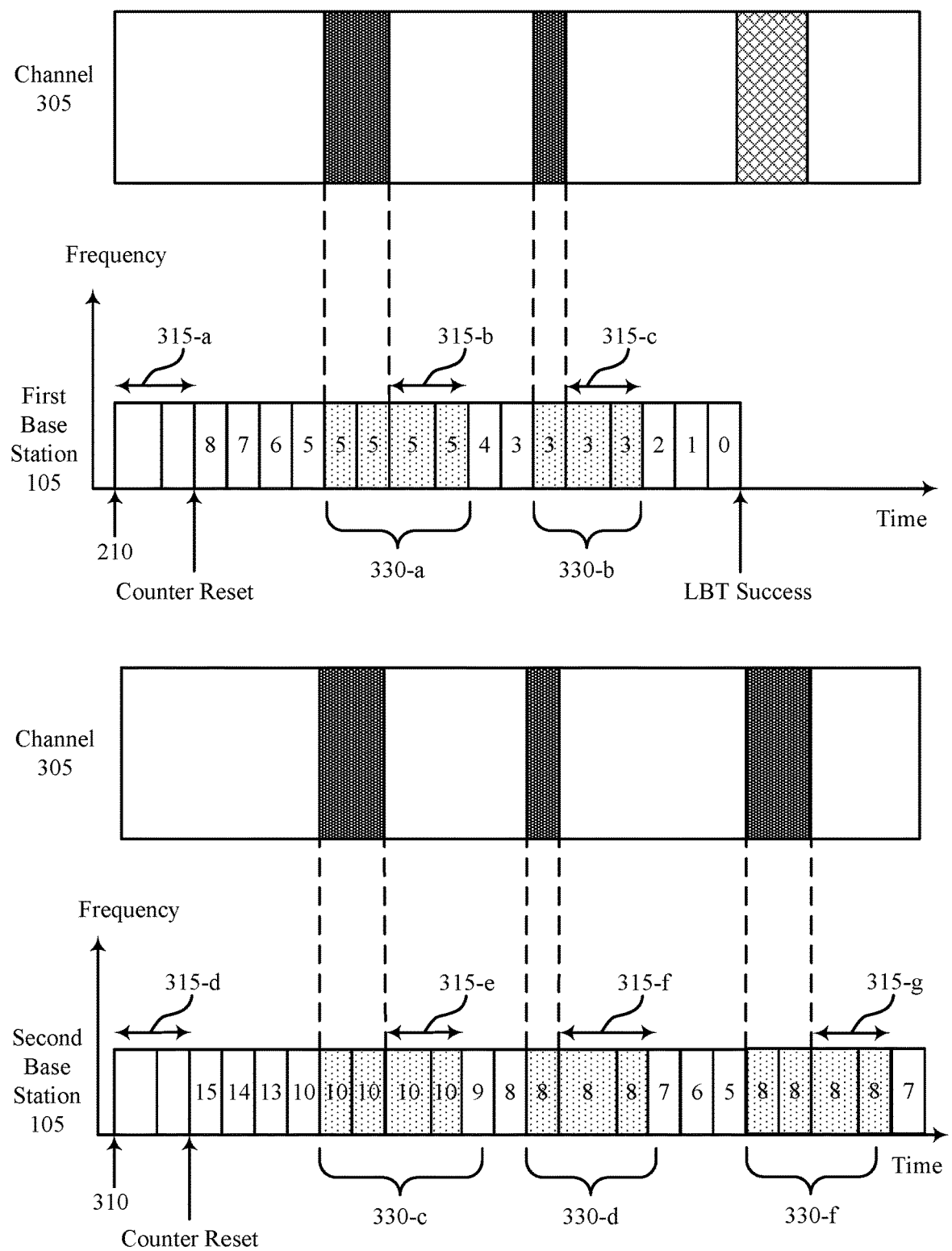
FIG. 3 illustrates an example of an LBT procedure that supports contention window management for group LBT based channel access in accordance with aspects of the present disclosure.

FIG. 3 illustrates an example of an LBT procedure 300 that supports contention window management for group LBT based channel access in accordance with aspects of the present disclosure. In some examples, LBT procedure 300 may be a category 4 LBT procedure, and may implement aspects of wireless communications systems 100 and 200.

In the example of FIG. 3, at 310, a first base station 105 may initiate a category 4 LBT procedure on a shared radio frequency spectrum band (e.g., channel 305), and the first base station 105 may perform channel sensing for fixed or variable deferral duration 315-a. Deferral durations 315 may be defined by the network, or randomly selected by base station 105 (e.g., from a set of candidate deferral durations). After performing the channel sensing and failing to detect energy on the channel (e.g., energy above a threshold), the first base station 105 may reset an LBT counter based on a contention window duration. A contention window duration may be defined by an amount of time or a number of transmission time intervals (TTIs) (e.g., a number of slots, mini-slots, symbols, frames, subframes, or the like). For instance, the contention window may have a duration of 32 slots. To reset an LBT counter, the first base station may randomly (or pseudo randomly) draw a number from the range defined by the contention window duration (e.g., where the contention window duration is 32, the LBT counter initial value may draw from the range of 0 to 31). In the example of FIG. 3, the first base station 105 may draw the number 8. In such examples, the LBT counter may be reset to 8. The first base station 105 may then decrement the counter when the first base station 105 fails to detect energy on the channel 305 (e.g., the sensed energy is below a threshold). The first base station 105 may freeze the LBT counter upon sensing interference. For instance, the first base station 105 may freeze the LBT counter when the first base station 105 detects interference 320 (e.g., the sensed energy is above the threshold) on the channel 305. Interference 320 may be generated by another base station 105, a UE 115, LTE traffic, Wi-Fi traffic, or the like. The base station 105 may freeze the LBT counter for time period 330-a including deferral duration 315-b and time period 330-b including deferral duration 315-c based on sensed interference. Once the first base station 105 determines that the LBT counter has been decremented to a zero value, the first base station 105 may determine that the LBT procedure is successful. Accordingly, the first base station 105 may access the channel 305 in the shared radio frequency spectrum for a downlink transmission 325 (e.g., to a UE 115).

The second base station 105 may also initiate a category 4 LBT procedure on the shared radio frequency spectrum band (e.g., channel 305), and the second base station 105 may perform channel sensing for a deferral duration 315-*d*. After performing the channel sensing and failing to detect energy on the channel (e.g., energy above a threshold), the second base station 105 may reset an LBT counter based on a contention window duration. For instance, the contention window may have a duration of 64 slots. To reset an LBT counter, the second base station may randomly (or pseudo randomly) draw a number from the range of the contention window (e.g., may draw a number between 0 and 63). In the example of FIG. 3, the second base station may draw the number 15. In such examples, the LBT counter may be reset to 15. The second base station 105 may then decrement the counter when the second base station 105 fails to detect energy on the channel 305 (e.g., the sensed energy is below a threshold). The second base station 105 may freeze the LBT counter when the second base station 105 detects interference 320 (e.g., the sensed energy is above the threshold) on the channel 305. The second base station 105 may freeze the LBT counter for time period 330-*c* including deferral duration 315-*e* and time period 330-*f* including deferral duration 315-*f* based on sensed interference. In this example, both the first base station 105 and the second base station 105 may sense the same interference 320 at the same time, and may freeze their respective LBT counters. After deferral duration 315-*f*, the second base station 105 may continue to decrement the LBT counter. When the first base station 105 initiates downlink transmission 325, the second base station 105 may detect interference 320 (e.g., the sensed energy is above the threshold) on the channel 305. The second base station 105 may freeze the LBT counter for time period 330-*f* including deferral duration 315-*g*, and may then continue to decrement the LBT timer.

As shown in the example of FIG. 3, the second base station 105 may draw larger numbers with which to reset the LBT counter based on a larger contention window duration. In such examples, the second base station 105 may be disadvantaged with respect to the first base station 105 because of the larger contention window duration. The second base station 105 may often fail to gain access to the channel 305 before first base station 105. Or, the second base station 105 may rarely or never gain access to the channel 305 (e.g., because interference from the first base station 105 or other traffic continually cause interference and second base station 105 continues to freeze the LBT counter before reaching 0). In some examples, the second base station 105 may have a larger contention window duration because it increments (e.g., doubles) the duration of the contention window duration after failed downlink transmission, collision, or early termination. In such examples, the second base station 105 may be unlikely or unable to gain access to channel 305. Contention window duration management, as described with respect to FIGS. 4-6, may be used to select larger or smaller contention window durations for different LBT procedure types, LBT priority classes, or based on other parameters, to improve system efficiency and increase or decrease advantages for some operators, devices, or the like.

In some examples, the first base station 105 may perform the category 4 LBT procedure described with respect to FIG. 3, and may gain access to the channel 305. Upon gaining access to the channel, the first base station 105 may become a leading base station 105 and may coordinate category 2 LBT procedures for the second base station 105 and other base stations 105. However, at another point in time, the first base station 105 may perform individual LBT procedures (instead of group LBT procedures). The first base station 105 may improve efficiency of the wireless communications system by selecting a contention window duration based on the LBT type, an LBT priority class corresponding to a pending transmission, or both. Similarly, the first base station 105 and the second base station 105 may be performing group LBT and individual LBT procedures, respectively. In such cases, first and second base stations 105 may select a contention window duration based on the LBT type, an LBT priority class corresponding to a pending transmission, or both. Base stations 105 may exploit common clocks by performing group LBTs according to the common clock. A base station 105 may select a contention window duration in any of the above described scenarios based on one or more sets of rules, based on preconfigured or standardized rules, based on an explicit indication from a network device, or the like. In some examples, a base station 105 may receive an indication from a network device indicating a common contention widow duration, a set of common contention window durations, a set of rules, or the like, and the base station 105 may select a contention window duration based thereon. In some examples (e.g., because category 2 LBT procedures may advantage base stations performing group LBT procedures), category 4 LBT procedures performed as part of group LBT procedures may be disadvantaged with longer contention window durations to provide improved fairness for all devices competing for the channel. Some of the above-mentioned techniques may only be performed some of the time based on duty-cycle threshold rules. Contention window management techniques to address the above discussed scenarios are described in greater detail with respect to FIG. 4.

Figure 4:
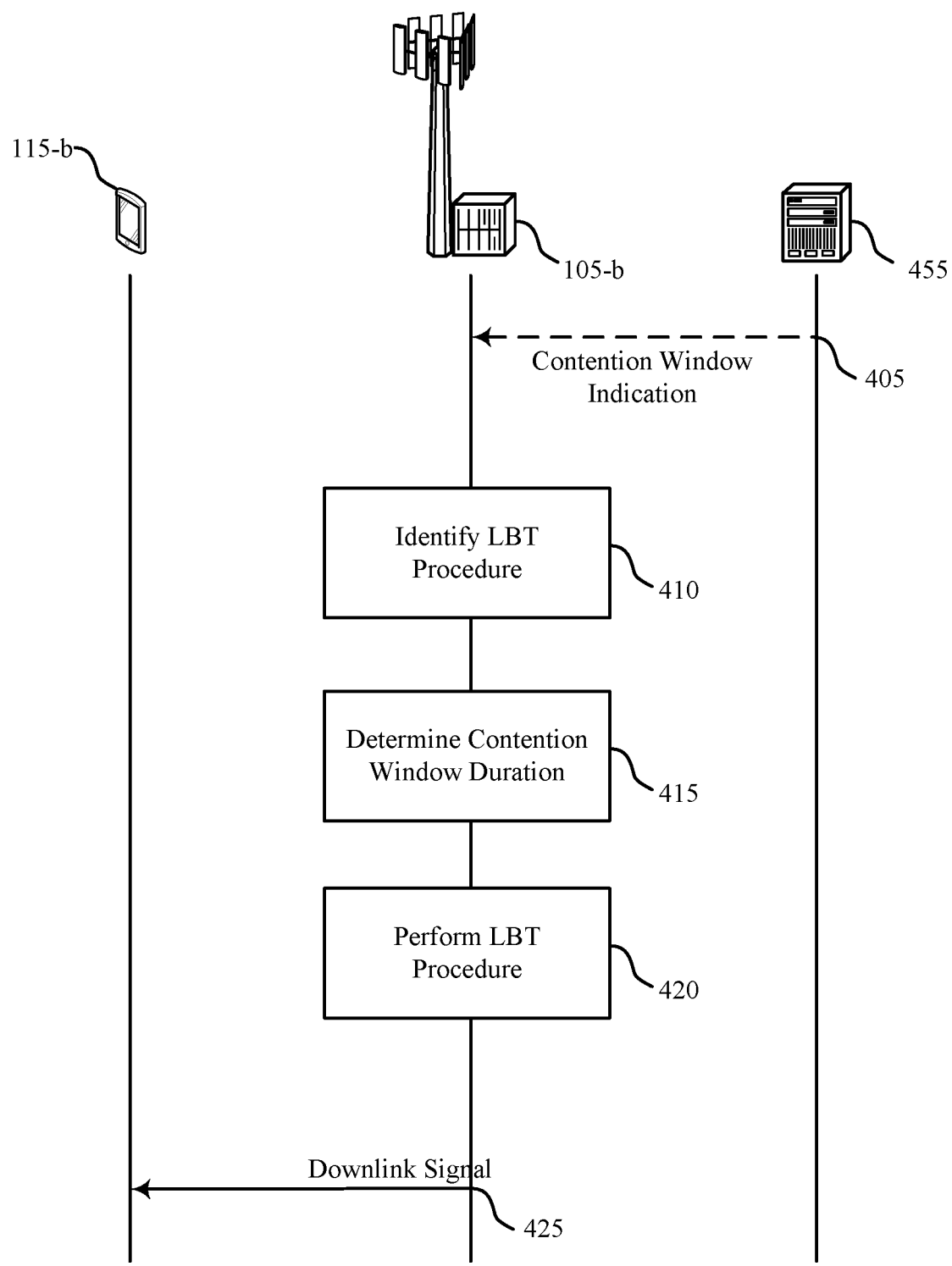
FIG. 4 illustrates an example of a process flow that supports contention window management for group LBT based channel access in accordance with aspects of the present disclosure.

FIG. 4 illustrates an example of a process flow 400 that supports contention window management for group LBT based channel access in accordance with aspects of the present disclosure. In some examples, process flow 400 may implement aspects of wireless communications systems 100 and 200.

In some examples, at 410, base station 105-*b* may identify an LBT procedure for transmitting a downlink signal to a UE 115-*b*. The LBT procedure may be a group LBT procedure or an individual LBT procedure. In some examples, group LBT procedures may be associated with a first set of contention window durations and individual LBT procedures may be associated with a second set of contention window durations. A contention window duration may lie between a minimum contention window durations (CWmin) and a maximum contention window duration (CWmax). Upon selecting a contention window duration, a device performing an LBT procedure may draw a random number from within the contention window duration, between CWmin and CWmax (e.g., between 0 and the contention window duration), as described in greater detail with respect to FIG. 3.

At 415, base station 105-*b* may determine a contention window duration based on the LBT procedure identified at 410. In some examples, group LBT procedures may be dynamically arranged (such that base station 105-*b* may sometimes perform group LBT procedures and may sometimes perform individual LBT procedures). In such cases, base station 105-*b* may select a contention window duration from two independent sets of contention window durations. independent sets of contention window durations may have independent minimum contention window values (CWmin) and independent maximum contention window values (CWmax).

In some examples, base station 105-*b* may identify a first set of contention window durations corresponding to group LBT procedures and a second set of contention window durations corresponding to individual LBT procedures. Base station 105-*b* may identify the independent sets of contention window durations via preconfiguration, backhaul signaling from coordinating base stations or network devices, over the air (OTA) messages from coordinating base stations or UEs 115-*b*, or the like. The first set of contention window durations may include contention window durations that correspond to respective LBT priority classes and the second set of contention window durations may include contention window durations that correspond to the same respective LBT priority classes. In some examples, LBT priority classes may be preconfigured at the base station 105-*b* based on a predefined mapping of LBT priority classes to corresponding CWmin and CWmax values (e.g., in a standards document), or may be configured by the network. LBT priority classes may correspond to different quality of service classes for pending traffic. LBT priority classes may provide for increased fairness on the channel, and may correspond to maximum channel occupancy times (MCOTs). In some examples, each LBT priority class may correspond to a maximum contention window value and a minimum contention window value, a contention window duration, an MCOT, or a combination thereof. Thus, at 415, base station 105-*b* may determine an LBT priority class and an LBT type (e.g., group LBT procedure or individual LBT procedure). The determining may be based on the pending downlink transmission. Based on the selected LBT type and the LBT priority class, base station 105-*b* may select a contention window duration from the first set of contention window durations or the second contention window durations. For instance, the first set of contention window durations may be for group LBT procedures, and may include four contention window durations for four LBT priority classes (e.g., LBT priority classes 1, 2, 3, and 4) and the second set of contention window durations may be for individual LBT procedures and may include four contention window durations for the same four LBT priority classes (e.g., LBT priority classes 1, 2, 3, and 4). In such examples, base station 105-*b* may determine, at 410, that it is to perform a group LBT procedure for a downlink transmission having an LBT priority class 2. In such examples, base station 105-*b* may select the contention window duration from the first set of contention window durations corresponding to LBT priority class 2. Alternatively, base station may determine, at 410, that it is to perform an individual procedure for a downlink transmission having an LBT priority class 3. In such examples, base station 105-*b* may select the contention window duration from the second set of contention window durations corresponding to LBT priority class 4.

In some examples, base station 105-*b* may identify a single set of contention window durations that can be used for either individual LBT procedures or group LBT procedures, based on one or more sets of rules. Base station 105-*b* may identify the set of contention window durations based on a preconfiguration, backhaul signaling over the air (OTA) messages from network devices or other base stations 105, or the like. In some examples, base station 105-*b* may determine a first contention window duration or first set of contention window durations for individual LBT procedures by applying a first set of rules to a set of contention window duration values (e.g., select a contention window duration for individual LBT procedures without manipulating the contention window duration) and may determine a second contention window duration or a set of contention window durations for group LBT procedures by applying a second set of rules to a set of contention window duration values (e.g., select a contention window duration for group LBT procedures and apply a rule to manipulate the selected contention window duration). In some examples, base station 105-*b* may identify, at 410, an LBT procedure. If base station 105-*b* determines to perform an individual LBT procedure, then base station 105-*b* may select a contention window duration from the single set of contention window durations (e.g., may select a contention window duration corresponding to an identified LBT priority class) and may perform the individual LBT procedure at 420 based on the selected contention window duration. However, if base station 105-*b* determines, at 410, to perform a group LBT procedure, then base station 105-*b* may apply the rules and manipulate the single set of contention window durations (e.g., may select a contention window duration from the single set of contention window durations based on an identified LBT priority class, and may manipulate the selected contention window duration based on the one or more rules). Base station 105-*b* may perform a group LBT procedure ate 420 based on the manipulated common contention window duration.

In some example, base station 105-*b* may identify a common contention window duration corresponding to some LBT priority classes, and individual contention window durations corresponding to other LBT priority classes. Thus, base station 105-*b* may identify an LBT procedure at 410, may identify an LBT priority class, and at 415 may select the common contention window duration or an individual contention window duration based on the selected LBT priority class.

In some examples of rule based manipulation of contention window duration, the network may define a common delta (e.g., an offset value) to be applied to contention widow durations for group LBT procedures. In such examples, a network device 455 may transmit, to base station 105-*b* (e.g., via backhaul signaling, OTA signaling, or the like) a contention window indication. The contention window indication may indicate the offset value, a common contention window duration, a set of common contention window durations, or the like. Base station 105-*b* may determine, at 410, to perform an individual LBT procedure. At 415, base station 105-*b* may select a common contention window duration or a contention window duration from a set of common contention window durations based on an LBT priority class, and may perform an individual LBT procedure based on the selected contention window duration at 420. In some examples, base station 105-*b* may determine, at 410, to perform a group LBT procedure. At 415, base station 105-*b* may select a common contention window duration (or a contention window duration from a set of common contention window durations based on an LBT priority class). Base station 105-*b* may then apply the offset value to the selected contention window duration, resulting in a longer contention window duration. In such examples, base station 105-*b* may draw a random number from the extended contention window duration (e.g., may draw a random number between (0 and contention window (CW)+delta−1). In some example, the offset value may only be valid during group LBT sessions. Increasing the contention window duration for group LBT procedures may increase fairness for all competing operators and corresponding devices on the channel.

In some examples, the network may define a minimum random number to be used for a group LBT procedure. In such examples, network device 455 may send (e.g., via backhaul signaling, OTA signaling, or the like) a contention window indication that indicates the minimum random number. If base station 105-*b* determines to perform an individual LBT procedure at 410, then at 420 base station 105-*b* may draw a random number from the contention window duration determined at 415 and may ignore the minimum random number. However, if base station 105-*b* determines to perform a group LBT procedure at 410, then at 420 base station 105-*b* may perform the group LBT procedure based on the minimum random number. In some examples, if base station 105-*b* draws a random number that is less than the minimum random number, then base station 105-*b* may redraw another random number. In such examples, base station 105-*b* may continue to redraw random numbers from within the contention window duration determined at 415 until the random number is greater than or equal to the minimum random number. Then, base station 105-*b* may perform the group LBT procedure at 420 according to the drawn random number that is greater than the minimum random number. In some examples, if base station 105-*b* draws a random number from the contention window duration determined at 415 and the random number is less than the minimum random number, base station 105-*b* may use the minimum random number instead of the drawn random number. Ensuring that the amount of time during which base station 105-*b* will decrement its LBT counter (as described with respect to FIG. 3) is equal to or greater than the minimum counter for group LBT procedures may improve fairness in accessing the channel.

In some examples, applying an offset value to a contention window duration, enforcing a minimum random number draw from contention window durations, or both, may be used by base station 105-*b* with respect to a duty-cycle. Base station 105-*b* may apply one or both of these procedures with respect to a duty-cycle threshold. For instance, if the threshold is fifty percent, then base station 105-*b* may apply the scheme (e.g., the offset value, the minimum value, or the like) for only fifty percent of a given duty cycle. In some examples, base station 105-*b* may implement a threshold (e.g., fifty percent) for a number of operators (e.g., two operators). Constraining some schemes (e.g., the offset value, the minimum value, or the like) according to the duty cycle constraints may improve fairness (e.g., across technologies, new and legacy devices, or the like). The duty cycle threshold may be preconfigured, received from network device 455 via backhaul signaling or OTA signaling, coordinated between base stations 105 via backhaul signaling, or the like.

In some examples, the network may define a common contention window duration for base stations 105 involved in a same group LBT session (e.g., for a group of base stations 105 using the same category 4 LBT priority class). In some such examples, each base station 105-*b* may use the common contention window duration throughout the group LBT session. In such examples, base station 105-*b* (as part of a group LBT session) may receive the common contention window duration from the network device 455 at 405, identify the group LBT procedure as part of the group LBT session at 410, determine the common contention window duration at 415, and perform the group LBT procedure at 420 according to the common contention window duration.

In some examples, each base station 105 participating in the group LBT session may use the common contention window duration throughout the group LBT session. For instance, base station 105-*b* may be a non-leading base station 105 (e.g., another base station 105 may be the first to gain access to the channel, and base station 105-*b* may perform one or more category 2 LBT procedures to gain access to the channel during the checked out COT. In such examples, base station 105-*b* may experience early termination (e.g., the category 2 LBT procedure may fail), and may continue to use the common contention window duration (e.g., may continue to re-draw random numbers from within the common contention window duration without manipulation of the common contention window duration). In some examples, in the case of early termination, base station 105-*b* may increase (e.g., double) the common contention window duration each time early termination occurs.

In some examples, the network may define a set of common contention windows for base stations 105 involved in a same group LBT session (e.g., for a group of base stations 105 using the same category 4 LBT priority class). In such examples, different base station 105 may be assigned different LBT priority classes for category 4 LBT procedures (e.g., via a contention window indication received from a network device 455 at 405). The base station 105 that first wins access to the channel and assumes the role of the leading base station 105 in the group LBT session may select a contention window duration based on the LBT priority class assigned to the leader base station 105. Similarly, the priority class of the leading base station 105 may define the final MCOT checked out for the group LBT procedure. In some examples, each base station 105 may adopt the LBT priority class of the leading base station 105 and may thus select the same common contention window duration. As discussed above, non-leading base stations 105 may use the set of common contention window durations throughout the group session, or may increase (e.g., double) the common contention window durations at each case of early termination.

In some examples, base station 105-*b* may increase (e.g., double) its contention window duration at each case of early termination, but may limit the increase over time based on a maximum contention window duration value (CWmax). For instance, base station 105-*b* may experience early termination during a group LBT procedure identified at 410. Upon each case of early termination, base station 105-*b* may increase (e.g., double) its contention window duration, and may draw a random number from within the increased contention window duration. However, if the contention window duration continues to increase indefinitely, the chances of a successful LBT procedure decrease, potentially resulting in a complete lack of opportunity for base station 105-*b* to perform a successful LBT procedure. Thus, base station 105-*b* may continue to increase the contention window duration until the contention window duration is equal to CWmax. Base station 105-*b* may continue to perform LBT procedures (e.g., category 2 LBT procedures as part of a group LBT procedure) until a successful LBT procedure (at which point the contention window duration for subsequent LBT procedures may be reset) or until base station 105-*b* has performed a number of LBT procedures using CWmax that satisfies a threshold number of LBT procedures. CWmax, the threshold number of LBT procedures using CWmax, or both, may be based on a contention window duration selected as described above with respect to FIG. 4, or may be indicated at 455 by network device 455 (e.g., via backhaul signaling, OTA signaling, or the like).

Upon determining that the number of LBT procedures using CWmax has satisfied the threshold number of LBT procedures, base station 105-b may reset the contention window duration. In some examples (e.g., where independent sets of contention window durations correspond to LBT type, where a base station 105 uses a common contention window duration a set of contention window durations defined by applying one or more rules), base station 105-b may reset the contention window duration to a minimum contention window duration (CWmin). In some examples (e.g., where a common contention window duration or a set of common contention window durations is defined by the network), the base station 105 may receive a specified CWmin value from network device 455 (at 405) and may reset the contention window duration to the CWmin value.

In some examples, common contention window durations may be selected and enforced with respect to a duty-cycle. For instance, base station 105-b may select common contention window durations with respect to a duty-cycle threshold. That is, for some percentage of a time period, base station 105-b may select common contention window durations that are large enough (e.g., above a threshold value) and for the remaining portion of a time period, base station 105-b may select contention window durations freely. The network may be enforced to convey or indicate such thresholds to base stations 105. The duty cycle threshold may be preconfigured, received from network device 455 via backhaul signaling or OTA signaling, coordinated between base stations 105 via backhaul signaling, or the like.

In some examples, a leading base station 105 performing a group LBT procedure may perform category 4 LBT procedures, and non-leading base stations 105 performing the group LBT may perform category 2 LBT procedures, leading to a reduced possibility of collisions. In such examples, base stations 105 participating in a group LBT session may be freed from conducting hybrid automatic repeat (HARQ) ACK signaling based on one or more of the contention window duration management techniques described herein. Such reduced signaling may increase system bandwidth availability, improve communications, and decrease overhead. Base stations 105 that are performing individual LBT procedures may continue to conduct HARQ ACK signaling.

In some examples, (e.g., instead of applying a duty cycle threshold constraint as described above), base stations 105 may perform contention window duration management based on a common clock. For instance, all base stations 105 competing for access to the channel may operate based on a common clock. Base stations 105 may perform individual or group LBT procedures during identified time periods based on the common clock. For instance, base stations 105 corresponding to a first operator may use larger contention window durations during some time periods, and base stations 105 corresponding to a second operator may use larger contention window durations during other time periods, according to the common clock, as described with respect to FIG. 5. In some examples, repeated intervals may correspond to different LBT priority classes, and a base station 105 may select a priority class and a time period based on the LBT priority class, as described in greater detail with respect to FIG. 6.

Figure 5:
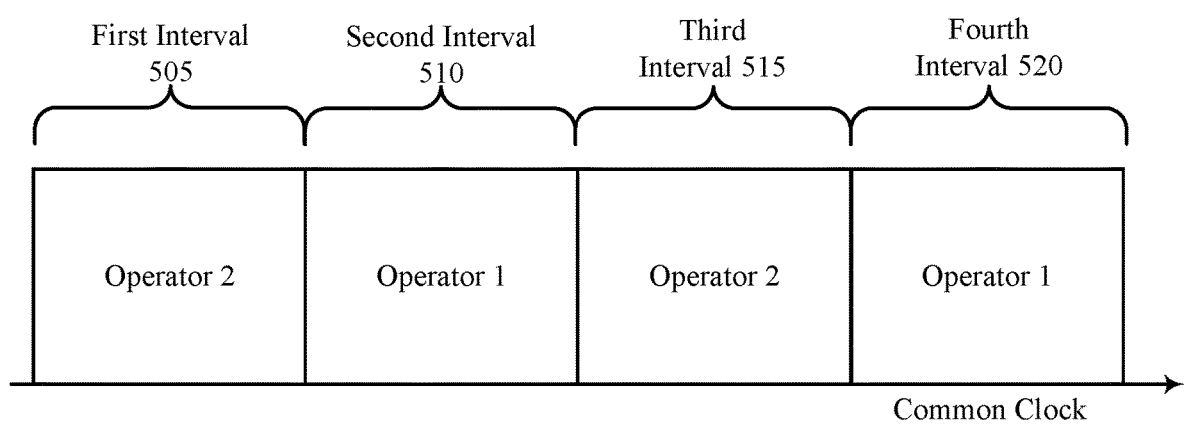
FIG. 5 illustrates an example of a timeline that supports contention window management for group LBT based channel access in accordance with aspects of the present disclosure.

FIG. 5 illustrates an example of a timeline 500 that supports contention window management for group LBT based channel access in accordance with aspects of the present disclosure. In some examples, timeline 500 may implement aspects of wireless communications systems 100 and 200.

In some examples, contention window duration management may be based on a common clock. All base stations 105 may compete for access on the same channel according to a common clock. In such examples, time intervals may be allocated to different operators. During an operator's time interval, base stations 105 corresponding to the owning operator may use larger contention window durations for individual and group LBT procedures and base stations 105 corresponding to non-owning operators may use smaller contention window durations for individual and group LBT procedures.

For instance, a first base station 105 corresponding to operator 2 may perform a group or individual LBT procedure during first interval 505, and may use a larger contention window duration than a second base station 105 corresponding to operator 1 performing a group or individual LBT procedure during first interval 505. During second interval 510, the first base station 105 corresponding to operator 2 may use a smaller contention window duration during second interval 510 than a contention window duration used by the second base station 105 corresponding to operator 1. Similarly, the first base station 105 may use larger contention window durations during third interval 515 than the second base station 105, and may use smaller contention window durations during fourth interval 520 for individual or group LBT procedures than the second base station 105. The second base station 105 may use smaller contention window durations during third interval 515 than the first base station 105, and may use larger contention window durations during fourth interval 520 than the first base station 105.

Figure 6:
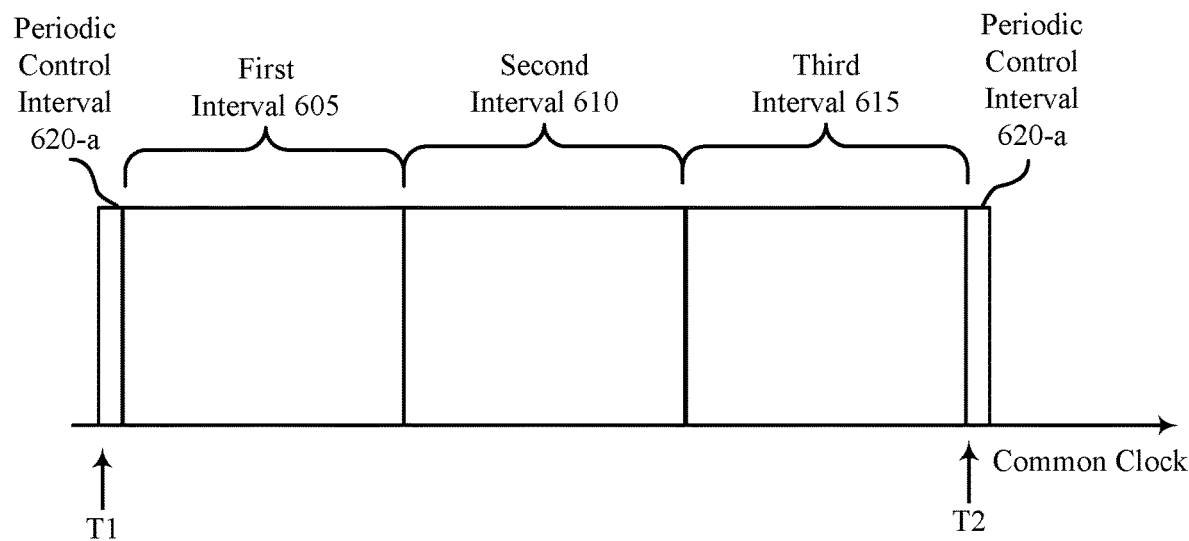
FIG. 6 illustrates an example of a timeline that supports contention window management for group LBT based channel access in accordance with aspects of the present disclosure.

FIG. 6 illustrates an example of a timeline 600 that supports contention window management for group LBT based channel access in accordance with aspects of the present disclosure. In some examples, timeline 600 may implement aspects of wireless communications systems 100 and 200.

In some examples, a common clock may define allowed LBT priority classes (e.g., allowed category 4 LBT priority classes) for each repeated interval. Such LBT priority classes may apply for both group and individual LBT procedures. Each LBT priority class may correspond to an MCOT. Higher priority LBT procedures may correspond to shorter MCOTs, and lower priority LBT procedures may correspond to longer MCOTs. Contention window duration management based on such a common clock and LBT priority assignments may protect periodic control intervals defined by the common clock.

A common clock may include periodic control intervals 620-a and 620-b. In some examples, all category 4 LBT priority classes may be allowed during first interval 605. Lowest priority category 4 LBT priority classes may not be allowed during second interval 610. Only highest priority category 4 LBT priority classes may be allowed during third interval 615. For instance, a base station 105 may identify, at time T1 after periodic control interval 620-a, a downlink transmission having a low priority (and a longer MCOT) the base station 105 may select a corresponding contention window duration and contend for access during first interval 605. Thus, the base station 105 is more likely to gain access to the channel, check out a longer COT based on the longer MCOT, and successfully transmit the downlink transmission without interfering with the periodic control interval 620-b at time T2. The base station 105 may refrain, however, from initiation the LBT procedure during second interval 610 and third interval 615, thus reducing the chances of interfering with periodic control interval 620-b.

A base station 105 may identify a downlink transmission having a medium or high priority LBT priority class, and may select a contention window duration and initiate an individual or group LBT procedure during the first interval. Because the intermediate level LBT priority class corresponds to an intermediate MCOT, the base station 105 may be more likely to successfully transmit before periodic control interval 620-b.

A base station 105 may identify a downlink transmission having a high priority LBT priority class corresponding to a short MCOT. The base station 105 may select a contention window duration based on the high priority LBT priority class, and initiate a group or individual LBT procedure during third interval 615. The base station 105 may be more likely to successfully transmit the high priority downlink transmission without interfering with the periodic control interval 620-b because of the shorter MCOT. However, the base station 105 may refrain from initiating individual or group LBT procedures having lower or intermediate priority LBT procedures during third interval 615.

Figure 7:
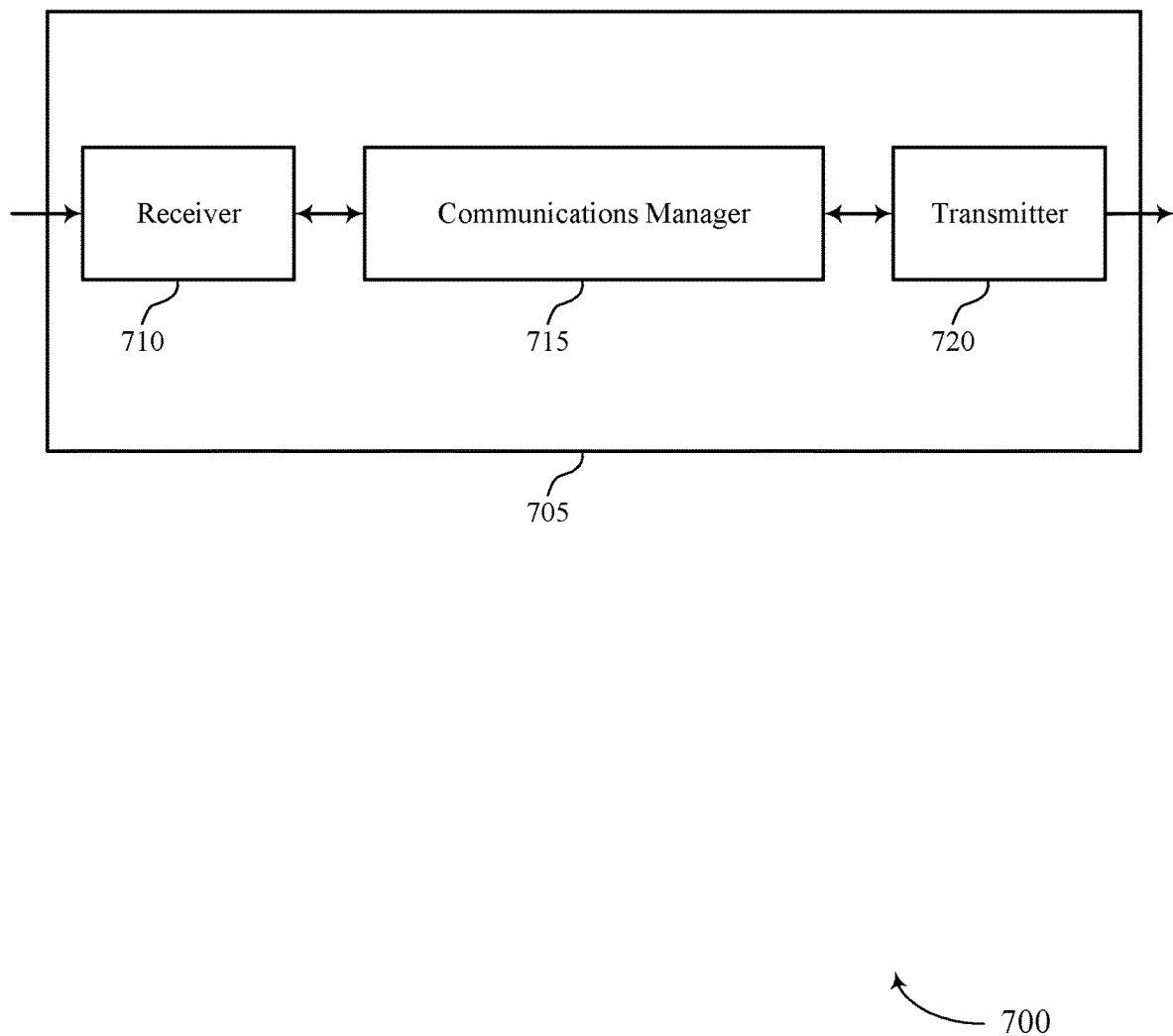
FIGS. 7 and 8 show block diagrams of devices that support contention window management for group LBT based channel access in accordance with aspects of the present disclosure.

FIG. 7 shows a block diagram 700 of a device 705 that supports contention window management for group LBT based channel access in accordance with aspects of the present disclosure. The device 705 may be an example of aspects of a UE 115 as described herein. The device 705 may include a receiver 710, a communications manager 715, and a transmitter 720. The device 705 may also include one or more processors, memory coupled with the one or more processors, and instructions stored in the memory that are executable by the one or more processors to enable the one or more processors to perform the channel access features discussed herein. Each of these components may be in communication with one another (e.g., via one or more buses). In some examples, communications manager 715 may be implemented by a modem. Communications manager 715 may communicate with transmitter 720 via a first interface. Communications manager 715 may output signals for transmission via the first interface. Communications manager 715 may interface with receiver 710 via a second interface. Communications manager 715 obtain signals via the second interface. In some examples, the modem may implement, via the first interface and the second interface, the techniques and methods described herein. Such techniques may result in improved efficiency, increased computational resources, and overall system efficiency. Implementing the described techniques by the modem may result in increased efficiency in use of unlicensed resources, and improved user experience.

The receiver 710 may receive information such as packets, user data, or control information associated with various information channels (e.g., control channels, data channels, and information related to contention window management for group LBT based channel access, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a common clock timing for a set of base stations communicating on a shared radio frequency spectrum band, determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station, monitor for downlink signals from the base station according to the determined set of time periods, and receive a downlink signal from the base station during one or more of the set of time periods based on based on the monitoring. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
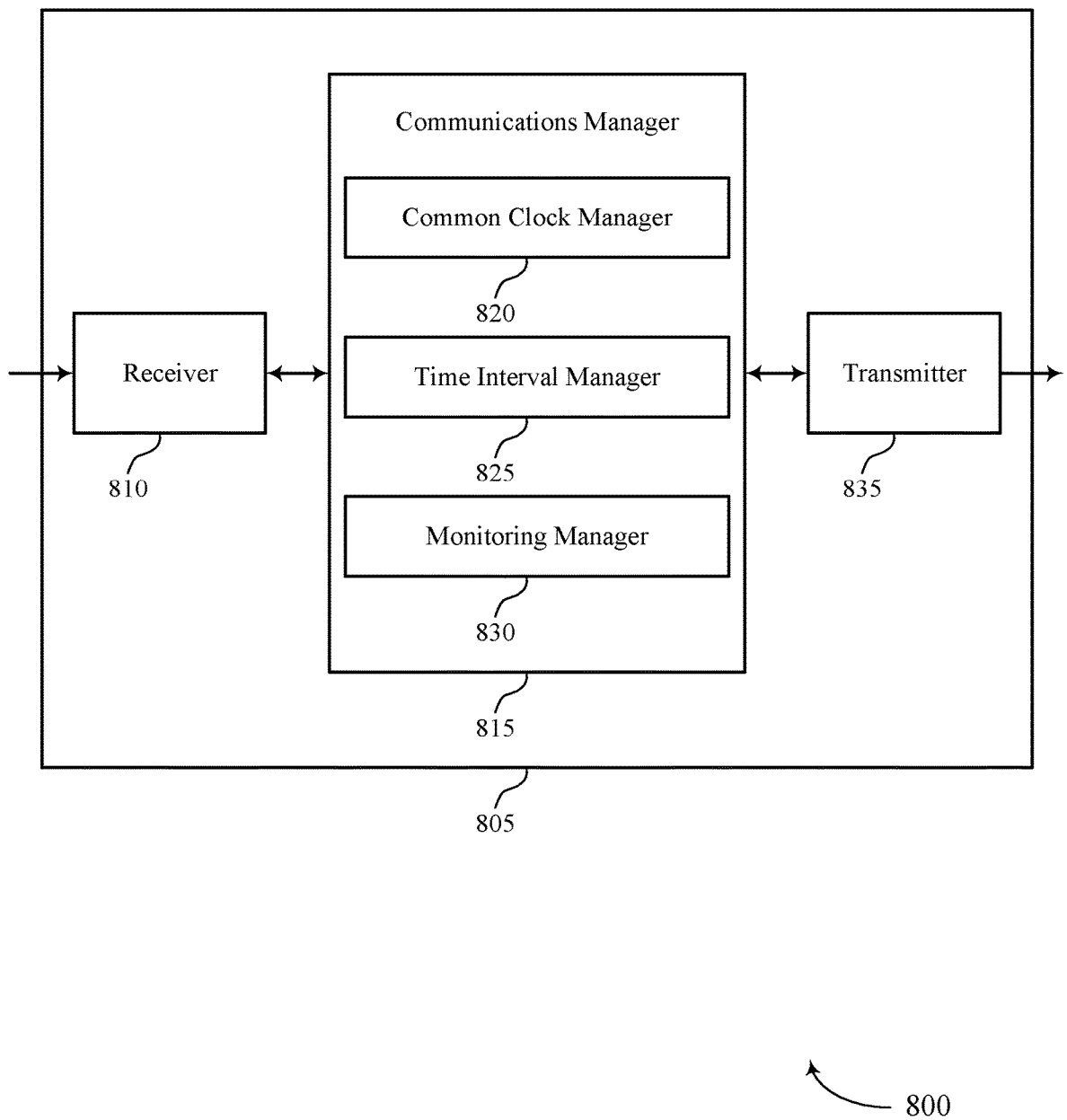

FIG. 8 shows a block diagram 800 of a device 805 that supports contention window management for group LBT based channel access in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to contention window management for group LBT based channel access, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a common clock manager 820, a time interval manager 825, and a monitoring manager 830. The communications manager 815 may be an example of aspects of the communications manager 1010 described herein.

The common clock manager 820 may identify a common clock timing for a set of base stations communicating on a shared radio frequency spectrum band.

The time interval manager 825 may determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station.

The monitoring manager 830 may monitor for downlink signals from the base station according to the determined set of time periods and receive a downlink signal from the base station during one or more of the set of time periods based on based on the monitoring.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

In some cases, the common clock manager 820, the time interval manager 825, and the monitoring manager 830 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the common clock manager 820, the time interval manager 825, and the monitoring manager 830 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
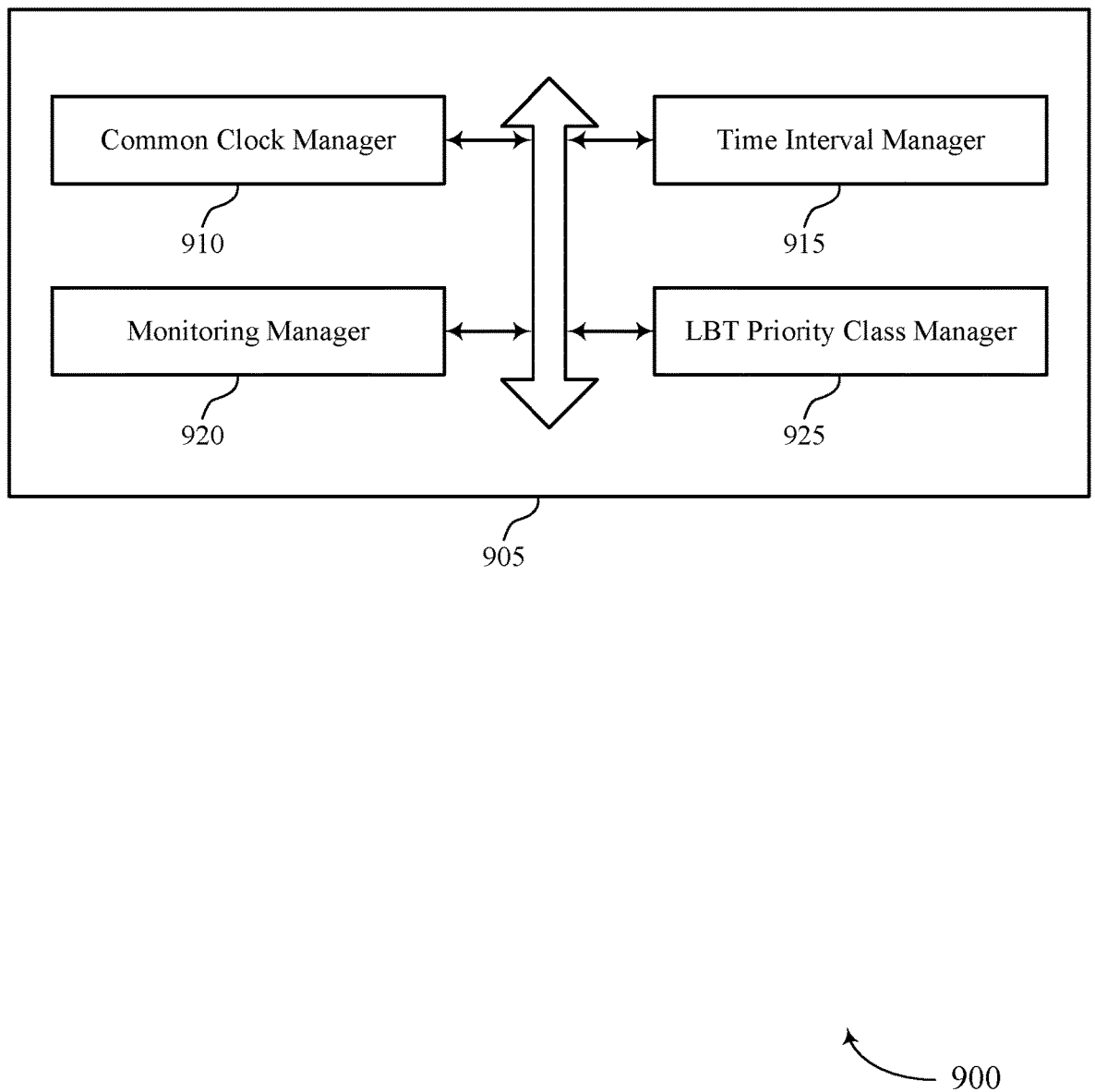
FIG. 9 shows a block diagram of a communications manager that supports contention window management for group LBT based channel access in accordance with aspects of the present disclosure.

FIG. 9 shows a block diagram 900 of a communications manager 905 that supports contention window management for group LBT based channel access in accordance with aspects of the present disclosure. The communications manager 905 may be an example of aspects of a communications manager 715, a communications manager 815, or a communications manager 1010 described herein. The communications manager 905 may include a common clock manager 910, a time interval manager 915, a monitoring manager 920, and an LBT priority class manager 925. Each of these modules may communicate, directly or indirectly, with one another (e.g., via one or more buses).

The common clock manager 910 may identify a common clock timing for a set of base stations communicating on a shared radio frequency spectrum band.

The time interval manager 915 may determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station. In some cases, each time period of the set of time periods corresponds to an operator.

The monitoring manager 920 may monitor for downlink signals from the base station according to the determined set of time periods. In some examples, the monitoring manager 920 may receive a downlink signal from the base station during one or more of the set of time periods based on based on the monitoring. In some examples, the monitoring manager 920 may monitor for periodic control signaling according to a control periodicity. In some examples, the monitoring manager 920 may receive control signals based on the monitoring. In some cases, each time period of the set of time periods corresponds to a listen-before-talk priority class.

In some cases, the common clock manager 910, the time interval manager 915, the monitoring manager 920, and the LBT priority class manager 925 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the common clock manager 910, the time interval manager 915, the monitoring manager 920, and the LBT priority class manager 925 discussed herein.

Figure 10:
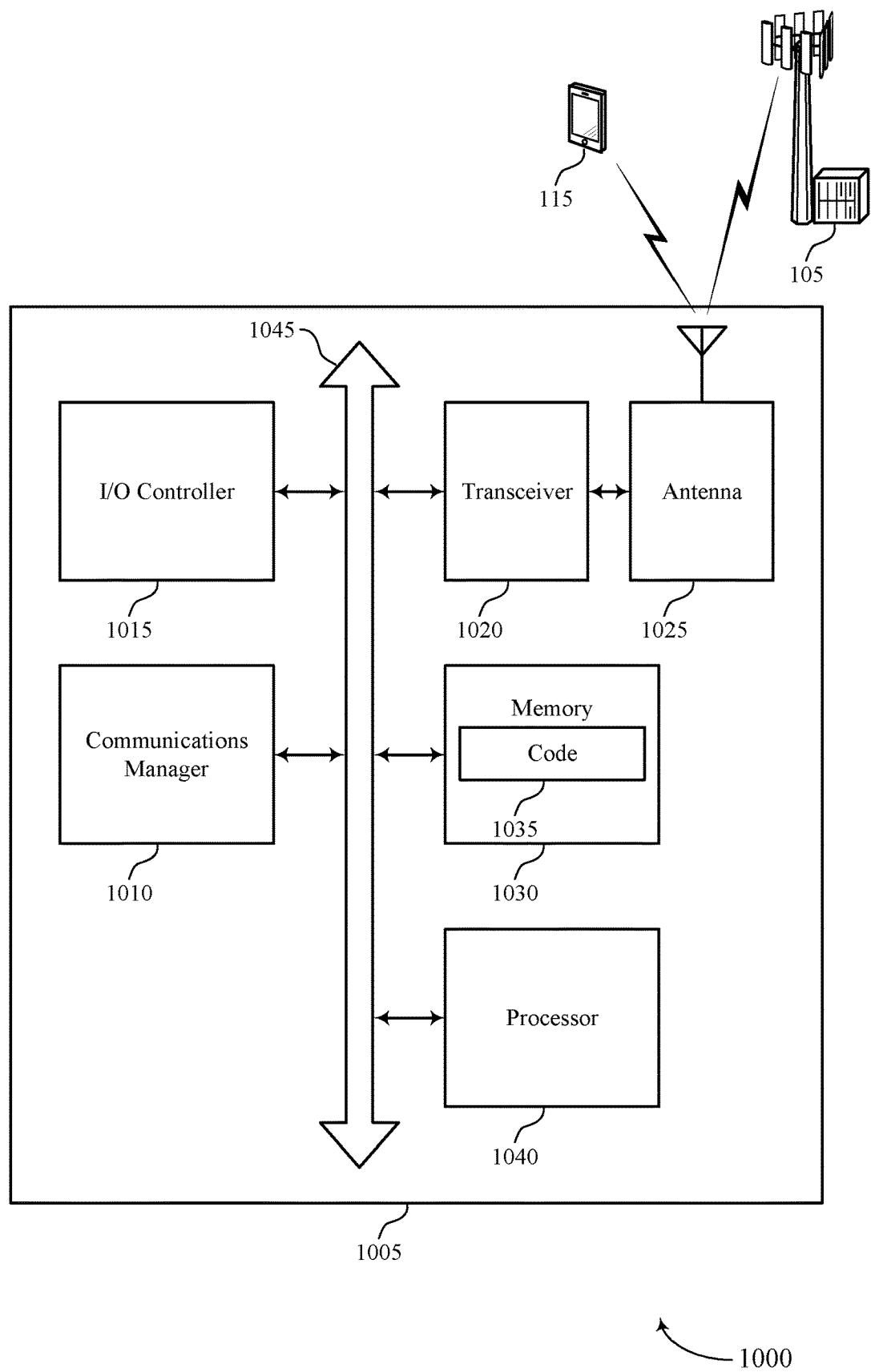
FIG. 10 shows a diagram of a system including a device that supports contention window management for group LBT based channel access in accordance with aspects of the present disclosure.

FIG. 10 shows a diagram of a system 1000 including a device 1005 that supports contention window management for group LBT based channel access in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a common clock timing for a set of base stations communicating on a shared radio frequency spectrum band, determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station, monitor for downlink signals from the base station according to the determined set of time periods, and receive a downlink signal from the base station during one or more of the set of time periods based on based on the monitoring.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting contention window management for group LBT based channel access).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
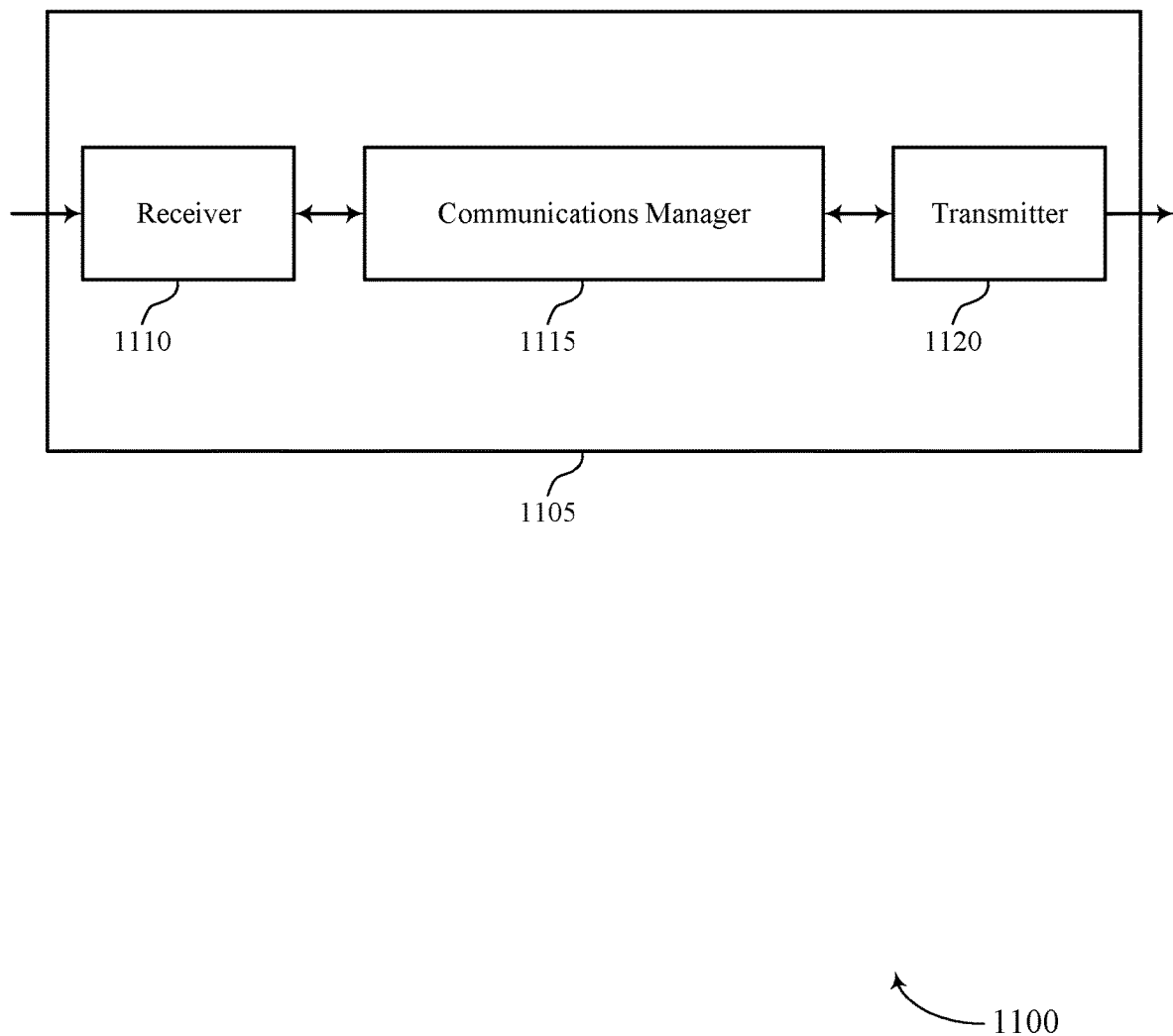
FIGS. 11 and 12 show block diagrams of devices that support contention window management for group LBT based channel access in accordance with aspects of the present disclosure.

FIG. 11 shows a block diagram 1100 of a device 1105 that supports contention window management for group LBT based channel access in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses). In some examples, communications manager 1115 may be implemented by a modem. Communications manager 1115 may communicate with transmitter 1120 via a first interface. Communications manager 1115 may output signals for transmission via the first interface. Communications manager 1115 may interface with receiver 1110 via a second interface. Communications manager 1115 may obtain signals (e.g., transmitted from a UE 115) via the second interface. In some examples, the modem may implement, via the first interface and the second interface, the techniques and methods described herein. Such techniques may result in improved efficiency, increased computational resources, and overall system efficiency. Implementing the described techniques by the modem may result in improved system efficiency and efficiency use of unlicensed resources, and improved user experience.

The receiver 1110 may receive information such as packets, user data, or control information associated with various information channels (e.g., control channels, data channels, and information related to contention window management for group LBT based channel access, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations, determine a contention window duration corresponding to the identified listen-before-talk procedure, perform the identified listen-before-talk procedure using the determined contention window duration, and transmit the downlink signal to the UE on the shared radio frequency spectrum band based on the performed listen-before-talk procedure. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
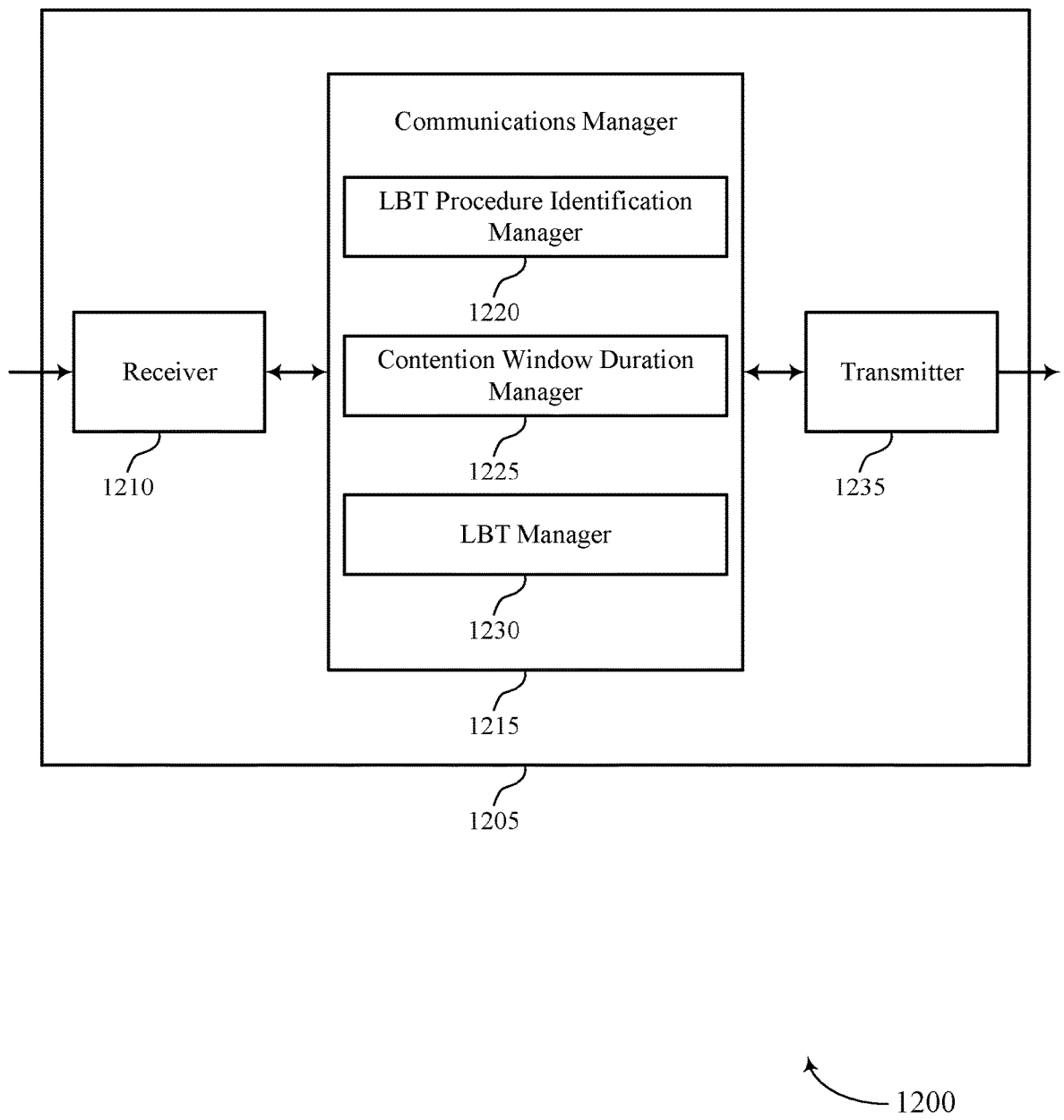

FIG. 12 shows a block diagram 1200 of a device 1205 that supports contention window management for group LBT based channel access in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to contention window management for group LBT based channel access, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an LBT procedure identification manager 1220, a contention window duration manager 1225, and an LBT manager 1230. The communications manager 1215 may be an example of aspects of the communications manager 1410 described herein.

The LBT procedure identification manager 1220 may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations.

The contention window duration manager 1225 may determine a contention window duration corresponding to the identified listen-before-talk procedure.

The LBT manager 1230 may perform the identified listen-before-talk procedure using the determined contention window duration and transmit the downlink signal to the UE on the shared radio frequency spectrum band based on the performed listen-before-talk procedure.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
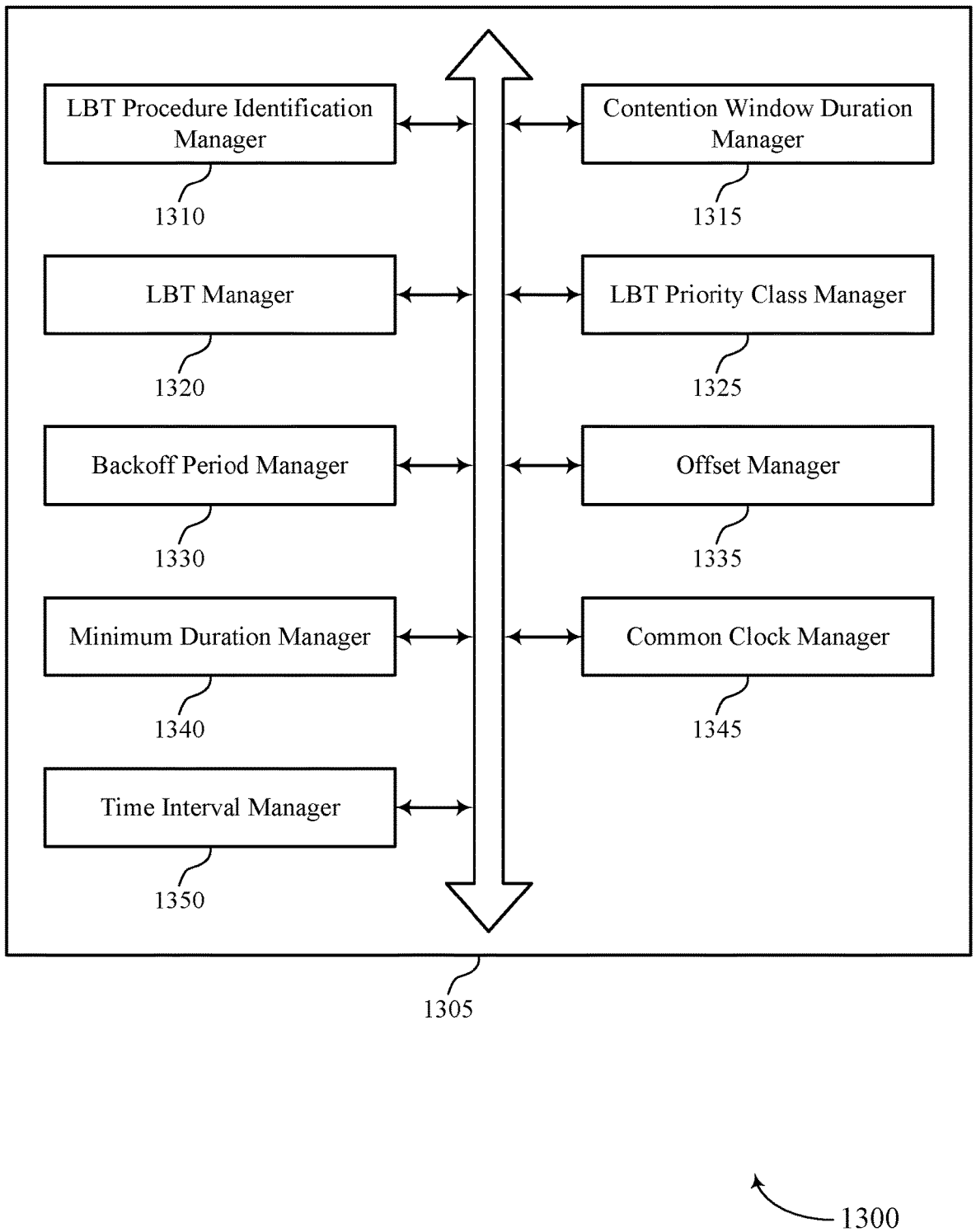
FIG. 13 shows a block diagram of a communications manager that supports contention window management for group LBT based channel access in accordance with aspects of the present disclosure.

FIG. 13 shows a block diagram 1300 of a communications manager 1305 that supports contention window management for group LBT based channel access in accordance with aspects of the present disclosure. The communications manager 1305 may be an example of aspects of a communications manager 1115, a communications manager 1215, or a communications manager 1410 described herein. The communications manager 1305 may include a LBT procedure identification manager 1310, a contention window duration manager 1315, a LBT manager 1320, a LBT priority class manager 1325, a backoff period manager 1330, an offset manager 1335, a minimum duration manager 1340, a common clock manager 1345, and a time interval manager 1350. Each of these modules may communicate, directly or indirectly, with one another (e.g., via one or more buses).

The LBT procedure identification manager 1310 may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations.

The contention window duration manager 1315 may determine a contention window duration corresponding to the identified listen-before-talk procedure. In some examples, the contention window duration manager 1315 may identify a set of contention window durations. In some examples, the contention window duration manager 1315 may determine the first set of contention window durations from the set of contention window durations based on a first set of rules for the group listen-before-talk procedure.

In some examples, the contention window duration manager 1315 may determine the second set of contention window durations from the set of contention window durations based on a second set of rules for the individual listen-before-talk procedure. In some examples, receiving, from a network device, an indication of a common contention window duration, where the first set of contention window durations includes the common contention window duration.

In some examples, the contention window duration manager 1315 may increase the common contention window duration by a predetermined factor. In some examples, the contention window duration manager 1315 may increase the common contention window duration by the predetermined factor after each failed group-listen-before-talk procedure of a first set of consecutive failed group listen-before-talk procedures until the incremented common contention window duration is greater than or equal to a maximum contention window duration.

In some examples, the contention window duration manager 1315 may reset the contention window duration based on the threshold number of failed group listen-before-talk procedures. In some examples, the contention window duration manager 1315 may set the reset contention window duration equal to a contention window minimum duration.

In some examples, the contention window duration manager 1315 may set the reset contention window duration equal to the common contention window duration. In some examples, receiving, from a network device, an indication of a set of common contention window durations, where the first set of contention window durations includes the set of common contention window durations, where each common contention window duration of the set of common contention window durations corresponds to respective listen-before-talk priority classes of a set of listen-before-talk priority classes, the method further including.

In some examples, the contention window duration manager 1315 may refrain, based on the identifying the group listen-before-talk procedure, from conducting a HARQ ACK procedure. In some cases, the contention window duration corresponds to a common contention window duration corresponding to the set of listen-before-talk priority classes including the identified listen-before-talk priority class, where determining the contention window duration is based on the common contention window duration and identifying the listen-before-talk priority class. In some cases, the one or more common contention window durations are based on a duty cycle threshold duration.

The LBT manager 1320 may perform the identified listen-before-talk procedure using the determined contention window duration. In some examples, the LBT manager 1320 may transmit the downlink signal to the UE on the shared radio frequency spectrum band based on the performed listen-before-talk procedure. In some examples, the LBT manager 1320 may perform the group listen-before-talk procedure. In some examples, the LBT manager 1320 may determine that the group listen-before-talk procedure has failed. In some examples, the LBT manager 1320 may perform the second group listen-before-talk procedure.

In some examples, the LBT manager 1320 may determine that the second group listen-before-talk procedure has failed.

In some examples, the LBT manager 1320 may perform the group list-before-talk procedure. In some examples, the LBT manager 1320 may perform a second set of consecutive failed group listen-before-talk procedures until the number of consecutive failed group listen-before-talk procedures satisfies a threshold number of failed group listen-before-talk procedures. In some examples, the LBT manager 1320 may determine that each base station of a set of base stations using the shared radio frequency spectrum band is participating in the identified group listen-before-talk procedure, where the refraining is based on the determining that each base station is participating in the identified group listen-before-talk procedure. In some examples, the LBT manager 1320 may send a downlink transmission on the shared radio frequency spectrum band during the selected time period.

The LBT priority class manager 1325 may identify a listen-before-talk priority class associated with the downlink signal, the contention window duration determined based on the identified listen-before-talk priority class. In some examples, the LBT priority class manager 1325 may select a contention window duration from one of the first set of contention window durations or the second set of contention window durations based on the identified listen-before-talk procedure and the identified listen-before-talk priority class. In some examples, the LBT priority class manager 1325 may determine that the second group listen-before-talk procedure has failed.

The backoff period manager 1330 may wait for a first backoff period according to the common contention window duration to perform a second group listen-before-talk procedure. In some examples, the backoff period manager 1330 may wait for a second backoff period according to the common contention window duration to perform a third group listen-before-talk procedure. In some examples, the backoff period manager 1330 may wait for a first backoff period based on the common contention window duration to perform a second group listen-before-talk procedure. In some examples, the backoff period manager 1330 may wait for a second backoff period according to the incremented common contention window duration to perform a third group listen-before-talk procedure.

The offset manager 1335 may identify, for the first set of contention window durations, an offset duration for the contention window duration. In some examples, the offset manager 1335 may select a random or pseudo-random number from the sum of the contention window duration and the offset duration.

The minimum duration manager 1340 may identify, for the first set of contention window durations, a minimum random duration based on the first set of contention window durations. In some examples, the minimum duration manager 1340 may select a first random number from within the contention window duration.

In some examples, the minimum duration manager 1340 may compare the selected random number with the minimum random duration. In some examples, the minimum duration manager 1340 may determine, based on the comparing, that the selected random number is less than the minimum random duration. In some examples, the minimum duration manager 1340 may select a second random number from within the contention window duration. In some examples, the minimum duration manager 1340 may select the minimum random duration instead of the selected random number.

The common clock manager 1345 may identify a common clock timing for a set of base stations communicating on the shared radio frequency spectrum band. In some examples, the common clock manager 1345 may select a first time period of the set of time periods.

The time interval manager 1350 may determine, based on the common clock timing, a set of time periods during which to transmit on the shared radio frequency spectrum band. In some cases, each time period of the set of time periods is associated with the contention window duration and where selecting the time period is based on determining a contention window duration. In some cases, each time period of the set of time periods is associated priority level, where selecting the time period is based on a listen-before-talk priority class associated with the identified listen-before-talk procedure.

Figure 14:
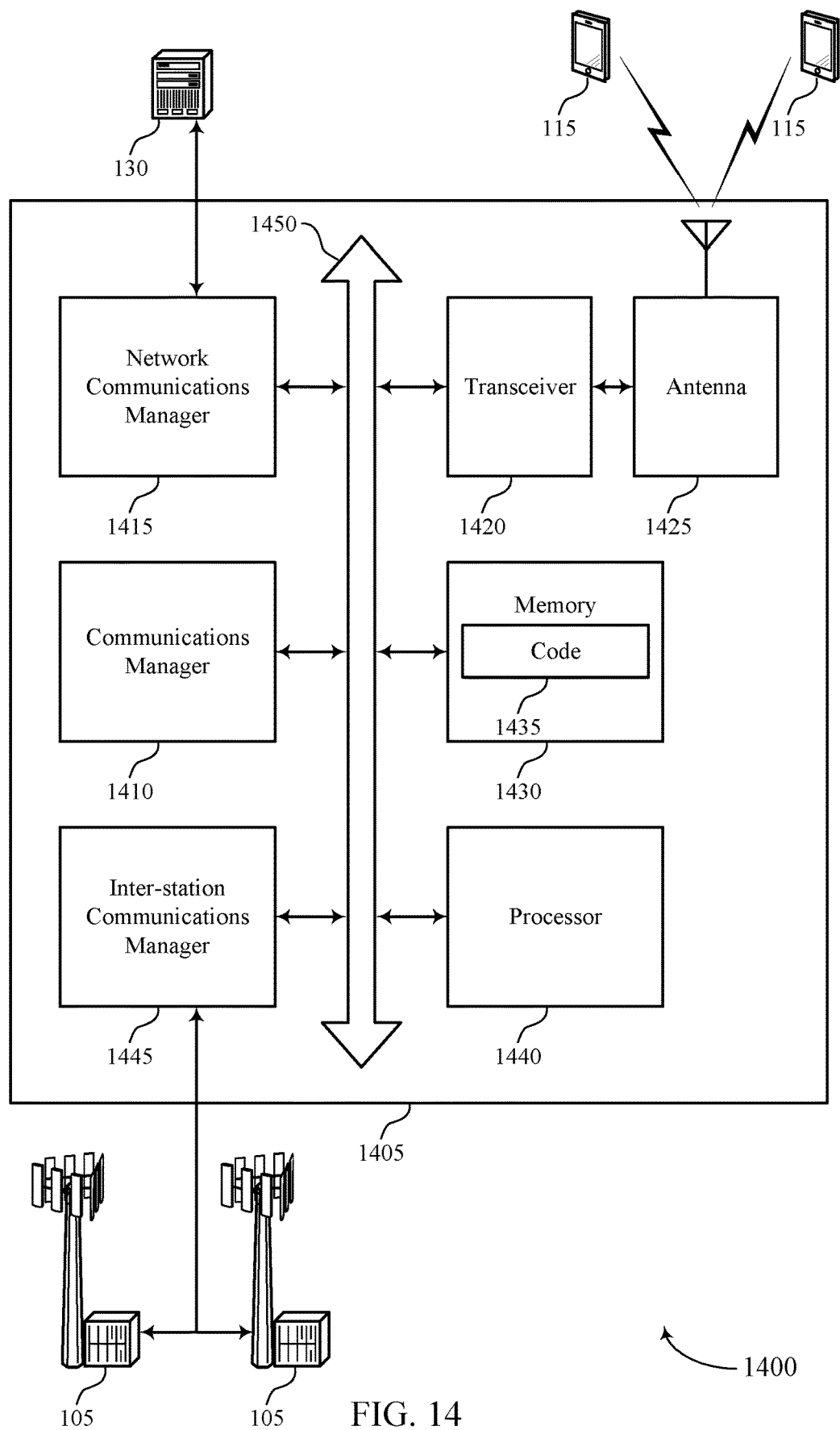
FIG. 14 shows a diagram of a system including a device that supports contention window management for group LBT based channel access in accordance with aspects of the present disclosure.

FIG. 14 shows a diagram of a system 1400 including a device 1405 that supports contention window management for group LBT based channel access in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations, determine a contention window duration corresponding to the identified listen-before-talk procedure, perform the identified listen-before-talk procedure using the determined contention window duration, and transmit the downlink signal to the UE on the shared radio frequency spectrum band based on the performed listen-before-talk procedure.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting contention window management for group LBT based channel access).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
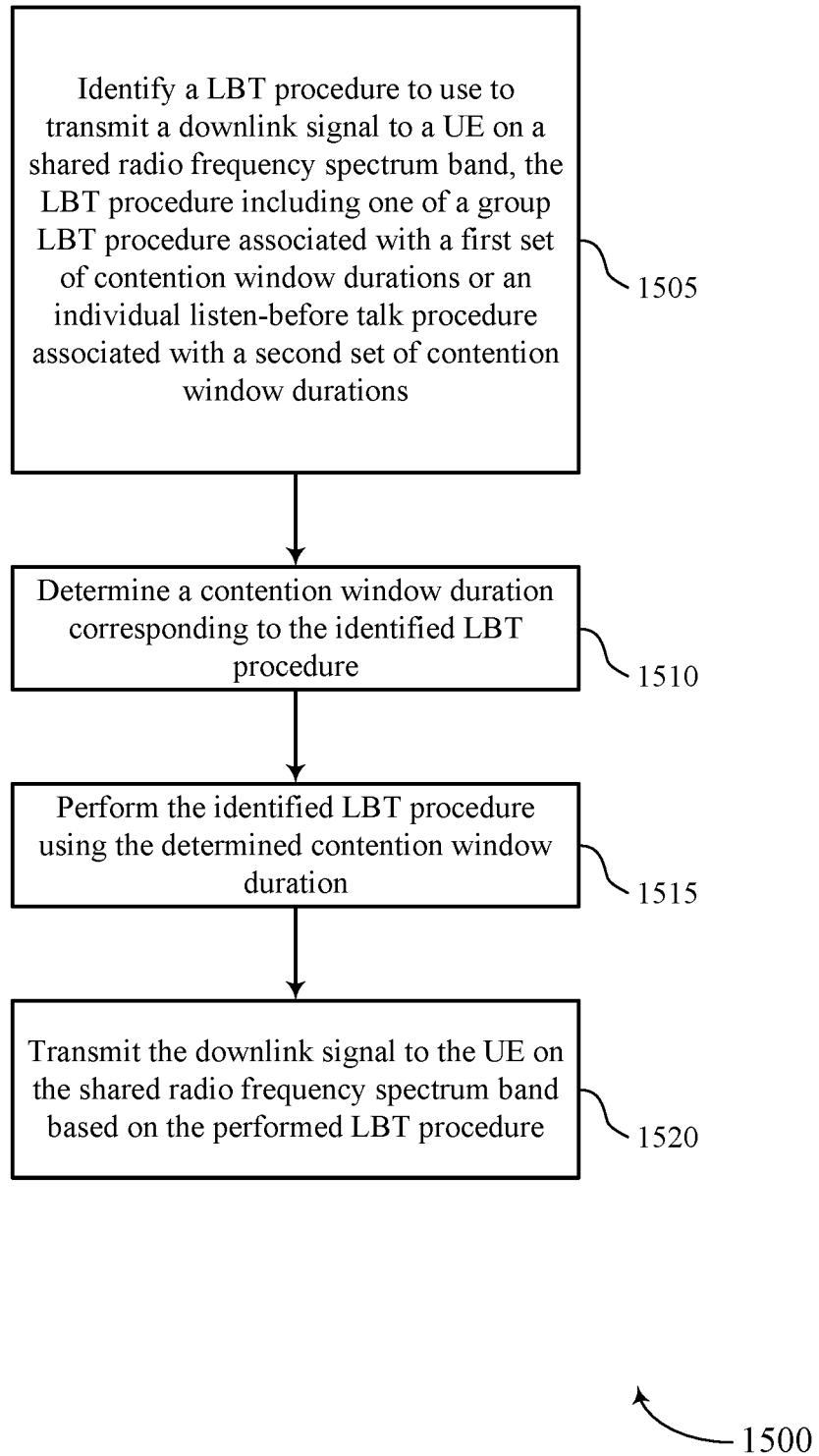
FIGS. 15 through 18 show flowcharts illustrating methods that support contention window management for group LBT based channel access in accordance with aspects of the present disclosure.

FIG. 15 shows a flowchart illustrating a method 1500 that supports contention window management for group LBT based channel access in accordance with aspects of the present disclosure. The operations of method 1500 may be implemented by a base station 105 or its components as described herein. For example, the operations of method 1500 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1505, the base station may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations. The operations of 1505 may be performed according to the methods described herein. In some examples, aspects of the operations of 1505 may be performed by an LBT procedure identification manager as described with reference to FIGS. 11 through 14.

At 1510, the base station may determine a contention window duration corresponding to the identified listen-before-talk procedure. The operations of 1510 may be performed according to the methods described herein. In some examples, aspects of the operations of 1510 may be performed by a contention window duration manager as described with reference to FIGS. 11 through 14.

At 1515, the base station may perform the identified listen-before-talk procedure using the determined contention window duration. The operations of 1515 may be performed according to the methods described herein. In some examples, aspects of the operations of 1515 may be performed by an LBT manager as described with reference to FIGS. 11 through 14.

At 1520, the base station may transmit the downlink signal to the UE on the shared radio frequency spectrum band based on the performed listen-before-talk procedure. The operations of 1520 may be performed according to the methods described herein. In some examples, aspects of the operations of 1520 may be performed by an LBT manager as described with reference to FIGS. 11 through 14.

Figure 16:
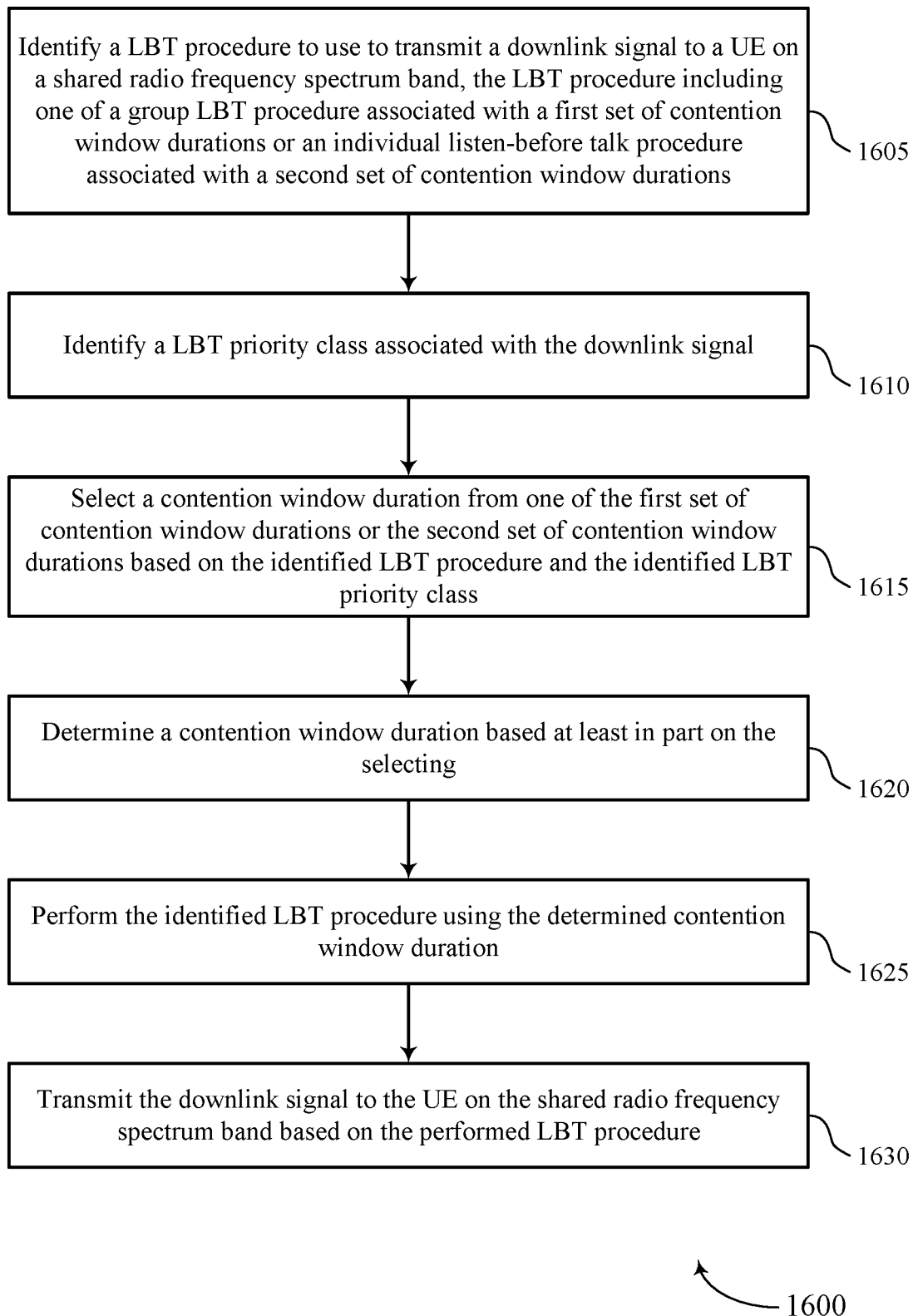

FIG. 16 shows a flowchart illustrating a method 1600 that supports contention window management for group LBT based channel access in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations. The operations of 1605 may be performed according to the methods described herein. In some examples, aspects of the operations of 1605 may be performed by an LBT procedure identification manager as described with reference to FIGS. 11 through 14.

At 1610, the base station may identify a listen-before-talk priority class associated with the downlink signal. The operations of 1610 may be performed according to the methods described herein. In some examples, aspects of the operations of 1610 may be performed by an LBT priority class manager as described with reference to FIGS. 11 through 14.

At 1615, the base station may select a contention window duration from one of the first set of contention window durations or the second set of contention window durations based on the identified listen-before-talk procedure and the identified listen-before-talk priority class. The operations of 1615 may be performed according to the methods described herein. In some examples, aspects of the operations of 1615 may be performed by an LBT priority class manager as described with reference to FIGS. 11 through 14.

At 1620, the base station may determine a contention window duration based at least in part on the selecting. The operations of 1620 may be performed according to the methods described herein. In some examples, aspects of the operations of 1620 may be performed by a contention window duration manager as described with reference to FIGS. 11 through 14.

At 1625, the base station may perform the identified listen-before-talk procedure using the determined contention window duration. The operations of 1625 may be performed according to the methods described herein. In some examples, aspects of the operations of 1625 may be performed by an LBT manager as described with reference to FIGS. 11 through 14.

At 1630, the base station may transmit the downlink signal to the UE on the shared radio frequency spectrum band based on the performed listen-before-talk procedure. The operations of 1630 may be performed according to the methods described herein. In some examples, aspects of the operations of 1630 may be performed by an LBT manager as described with reference to FIGS. 11 through 14.

Figure 17:
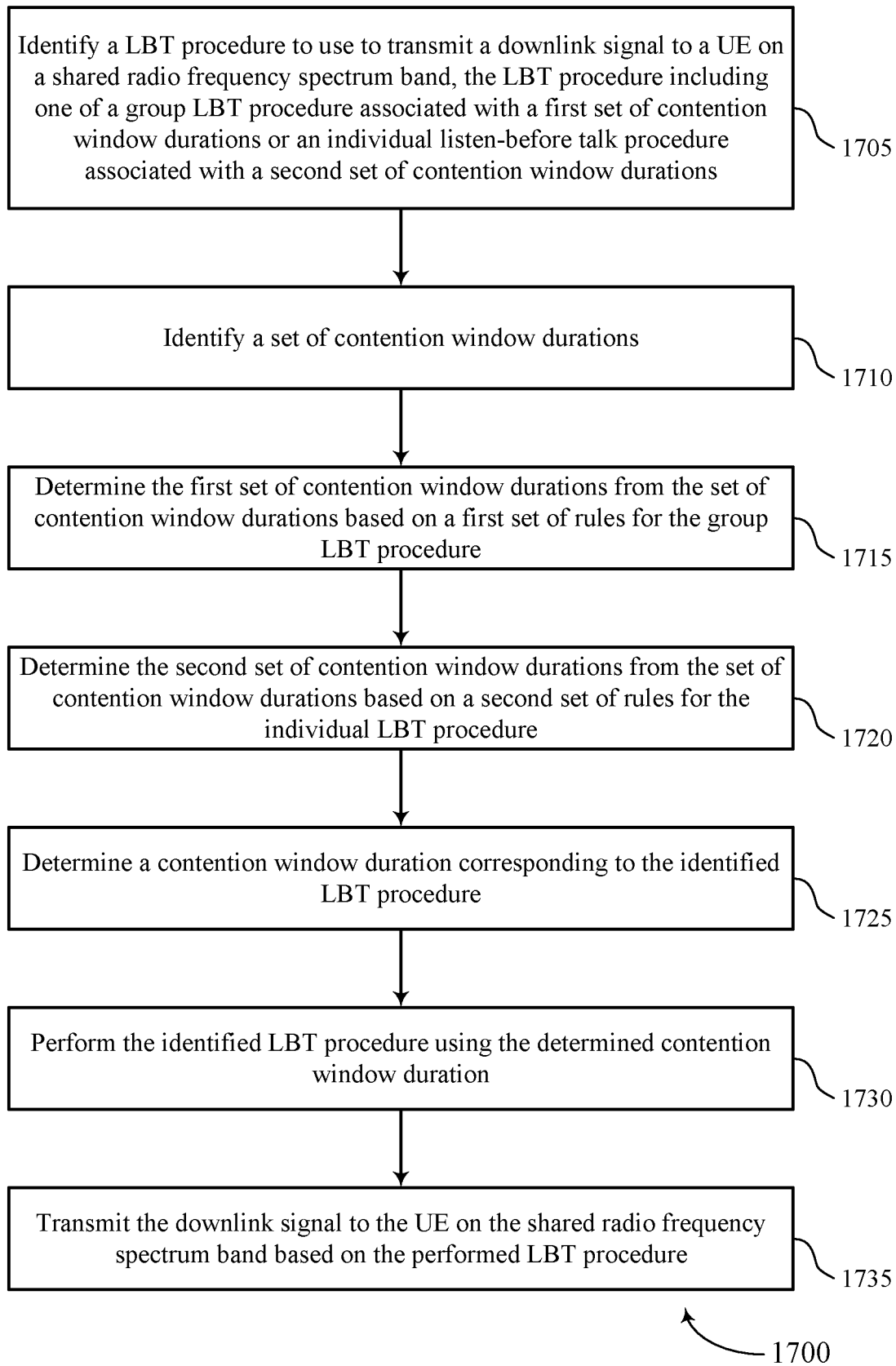

FIG. 17 shows a flowchart illustrating a method 1700 that supports contention window management for group LBT based channel access in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1705, the base station may identify a listen-before-talk procedure to use to transmit a downlink signal to a UE on a shared radio frequency spectrum band, the listen-before-talk procedure including one of a group listen-before-talk procedure associated with a first set of contention window durations or an individual listen-before talk procedure associated with a second set of contention window durations. The operations of 1705 may be performed according to the methods described herein. In some examples, aspects of the operations of 1705 may be performed by an LBT procedure identification manager as described with reference to FIGS. 11 through 14.

At 1710, the base station may identify a set of contention window durations. The operations of 1710 may be performed according to the methods described herein. In some examples, aspects of the operations of 1710 may be performed by a contention window duration manager as described with reference to FIGS. 11 through 14.

At 1715, the base station may determine the first set of contention window durations from the set of contention window durations based on a first set of rules for the group listen-before-talk procedure. The operations of 1715 may be performed according to the methods described herein. In some examples, aspects of the operations of 1715 may be performed by a contention window duration manager as described with reference to FIGS. 11 through 14.

At 1720, the base station may determine the second set of contention window durations from the set of contention window durations based on a second set of rules for the individual listen-before-talk procedure. The operations of 1720 may be performed according to the methods described herein. In some examples, aspects of the operations of 1720 may be performed by a contention window duration manager as described with reference to FIGS. 11 through 14.

At 1725, the base station may determine a contention window duration corresponding to the identified listen-before-talk procedure. The operations of 1725 may be performed according to the methods described herein. In some examples, aspects of the operations of 1725 may be performed by a contention window duration manager as described with reference to FIGS. 11 through 14.

At 1730, the base station may perform the identified listen-before-talk procedure using the determined contention window duration. The operations of 1730 may be performed according to the methods described herein. In some examples, aspects of the operations of 1730 may be performed by an LBT manager as described with reference to FIGS. 11 through 14.

At 1735, the base station may transmit the downlink signal to the UE on the shared radio frequency spectrum band based on the performed listen-before-talk procedure. The operations of 1735 may be performed according to the methods described herein. In some examples, aspects of the operations of 1735 may be performed by an LBT manager as described with reference to FIGS. 11 through 14.

Figure 18:
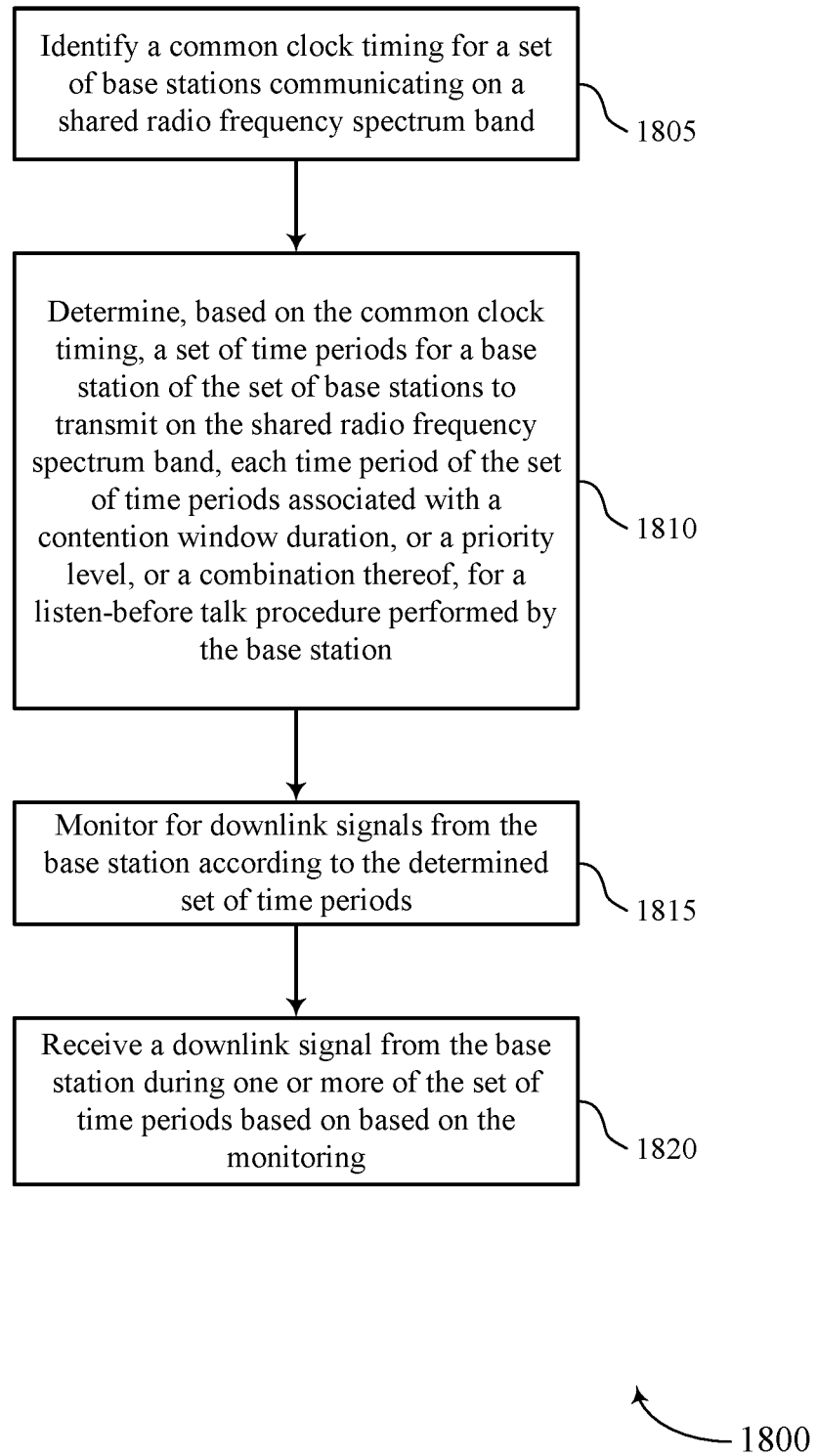

FIG. 18 shows a flowchart illustrating a method 1800 that supports contention window management for group LBT based channel access in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1805, the UE may identify a common clock timing for a set of base stations communicating on a shared radio frequency spectrum band. The operations of 1805 may be performed according to the methods described herein. In some examples, aspects of the operations of 1805 may be performed by a common clock manager as described with reference to FIGS. 7 through 10.

At 1810, the UE may determine, based on the common clock timing, a set of time periods for a base station of the set of base stations to transmit on the shared radio frequency spectrum band, each time period of the set of time periods associated with a contention window duration, or a priority level, or a combination thereof, for a listen-before talk procedure performed by the base station. The operations of 1810 may be performed according to the methods described herein. In some examples, aspects of the operations of 1810 may be performed by a time interval manager as described with reference to FIGS. 7 through 10.

At 1815, the UE may monitor for downlink signals from the base station according to the determined set of time periods. The operations of 1815 may be performed according to the methods described herein. In some examples, aspects of the operations of 1815 may be performed by a monitoring manager as described with reference to FIGS. 7 through 10.

At 1820, the UE may receive a downlink signal from the base station during one or more of the set of time periods based on based on the monitoring. The operations of 1820 may be performed according to the methods described herein. In some examples, aspects of the operations of 1820 may be performed by a monitoring manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM), ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station, comprising:
    identifying a listen-before-talk procedure to use to transmit a downlink signal to a user equipment (UE) on a shared radio frequency spectrum band, the listen-before-talk procedure comprising a type of listen-before talk procedure that is one of a group listen-before-talk procedure associated with a first set of contention window durations or an individual listen-before-talk procedure associated with a second set of contention window durations;
    determining a contention window duration corresponding to the type of listen-before-talk procedure that is the group listen-before-talk procedure;
    performing the identified group listen-before-talk procedure using the determined contention window duration;
    increasing a common contention window duration by a predetermined factor after each failed group listen-before-talk procedure of a first plurality of consecutive failed group listen-before-talk procedures comprising the identified group listen-before-talk procedure until the common contention window duration is greater than or equal to a maximum contention window duration;
    performing a second plurality of consecutive failed group listen-before-talk procedures until a number of consecutive failed group listen-before-talk procedures satisfies a threshold number of failed group listen-before-talk procedures;
    resetting the contention window duration based at least in part on the threshold number of failed group listen-before-talk procedures; and
    transmitting the downlink signal to the UE on the shared radio frequency spectrum band based at least in part on one or more additional performed listen-before-talk procedures according to the reset contention window duration.

2. The method of claim 1, further comprising:
    identifying a listen-before-talk priority class associated with the downlink signal, the contention window duration determined based at least in part on the identified listen-before-talk priority class.

3. The method of claim 2, wherein each contention window duration of the first and second sets of contention window durations correspond to a respective listen-before-talk priority class of a plurality of listen-before-talk priority classes, and determining the contention window duration comprises:
    selecting a contention window duration from one of the first set of contention window durations or the second set of contention window durations based at least in part on the identified listen-before-talk procedure and the identified listen-before-talk priority class.

4. The method of claim 2, wherein the contention window duration corresponds to the common contention window duration corresponding to a plurality of listen-before-talk priority classes including the identified listen-before-talk priority class, wherein determining the contention window duration is based at least in part on the common contention window duration and identifying the listen-before-talk priority class.

5. The method of claim 1, further comprising:
    identifying a plurality of contention window durations;
    determining the first set of contention window durations from the plurality of contention window durations based at least in part on a first set of rules for the group listen-before-talk procedure; and
    determining the second set of contention window durations from the plurality of contention window durations based at least in part on a second set of rules for the individual listen-before-talk procedure.

6. The method of claim 1, further comprising:
    receiving, from a network device, an indication of the common contention window duration, wherein the first set of contention window durations comprises the common contention window duration.

7. The method of claim 6, wherein performing the identified listen-before-talk procedure using the determined contention window duration comprises:
    performing the group listen-before-talk procedure;
    determining that the group listen-before-talk procedure has failed;
    waiting for a first backoff period according to the common contention window duration to perform a second group listen-before-talk procedure;
    performing the second group listen-before-talk procedure;
    determining that the second group listen-before-talk procedure has failed; and
    waiting for a second backoff period according to the common contention window duration to perform a third group listen-before-talk procedure.

8. The method of claim 6, wherein performing the first plurality of consecutive failed group listen-before-talk procedures comprises:
performing the group listen-before-talk procedure;
determining that the group listen-before-talk procedure has failed;
waiting for a first backoff period based at least in part on the common contention window duration to perform a second group listen-before-talk procedure;
performing the second group listen-before-talk procedure;
determining that the second group listen-before-talk procedure has failed;
increasing the common contention window duration by a predetermined factor; and
waiting for a second backoff period according to the common contention window duration to perform a third group listen-before-talk procedure.

9. The method of claim 6, wherein the common contention window duration is based at least in part on a duty cycle threshold duration.

10. The method of claim 1, wherein resetting the contention window duration further comprises:
setting the reset contention window duration equal to a contention window minimum duration.

11. The method of claim 1, wherein resetting the contention window duration further comprises:
setting the reset contention window duration equal to the common contention window duration.

12. The method of claim 1, further comprising:
receiving, from a network device, an indication of a set of common contention window durations, wherein the first set of contention window durations comprises the set of common contention window durations, wherein each common contention window duration of the set of common contention window durations corresponds to respective listen-before-talk priority classes of a set of listen-before-talk priority classes, the method further comprising;
receiving, from the network device, an indication of a listen-before-talk priority class associated with the base station, the listen-before-talk priority class being different than a priority class associated with other base stations of a plurality of base stations configured to use the set of common contention window durations; and
selecting the common contention window duration of the set of common contention window durations based at least in part on the listen-before-talk priority class associated with the base station, wherein determining a contention window duration corresponding to the identified group listen-before-talk procedure is based at least in part on the selecting.

13. The method of claim 1, wherein determining the contention window duration corresponding to the identified group listen-before-talk procedure further comprises:
identifying, for the first set of contention window durations, an offset duration for the contention window duration; and
selecting a random or pseudo-random number from a sum of the contention window duration and the offset duration.

14. The method of claim 1, wherein determining the contention window duration corresponding to the identified group listen-before-talk procedure further comprises:
identifying, for the first set of contention window durations, a minimum random duration based on the first set of contention window durations;
selecting a first random number from within the contention window duration; and
comparing the selected random number with the minimum random duration.

15. The method of claim 14, further comprising:
determining, based at least in part on the comparing, that the selected random number is less than the minimum random duration; and
selecting a second random number from within the contention window duration.

16. The method of claim 14, further comprising:
determining, based at least in part on the comparing, that the selected random number is less than the minimum random duration; and
selecting the minimum random duration instead of the selected random number.

17. The method of claim 1, wherein identifying a listen-before-talk procedure further comprises identifying a group listen-before-talk procedure, the method further comprising:
refraining, based on the identifying the group listen-before-talk procedure, from conducting a hybrid automatic repeat request (HARQ) acknowledgement (ACK) procedure.

18. The method of claim 17, further comprising:
determining that each base station of a plurality of base stations using the shared radio frequency spectrum band is participating in the identified group listen-before-talk procedure, wherein the refraining is based at least in part on the determining that each base station is participating in the identified group listen-before-talk procedure.

19. The method of claim 1, further comprising:
identifying a common clock timing for a plurality of base stations communicating on the shared radio frequency spectrum band;
determining, based at least in part on the common clock timing, a plurality of time periods during which to transmit on the shared radio frequency spectrum band;
selecting a first time period of the plurality of time periods; and
sending a downlink transmission on the shared radio frequency spectrum band during the selected time period.

20. The method of claim 19, wherein each time period of the plurality of time periods is associated with the contention window duration and wherein selecting the time period is based at least in part on determining a contention window duration.

21. The method of claim 19, wherein each time period of the plurality of time periods is associated with a priority level, wherein selecting the time period is based at least in part on a listen-before-talk priority class associated with the identified group listen-before-talk procedure.

22. A method for wireless communications at a user equipment (UE), comprising:
identifying a common clock timing for a plurality of base stations communicating on a shared radio frequency spectrum band;
determining, based at least in part on the common clock timing for the plurality of base stations, a plurality of time periods for a base station of the plurality of base stations to transmit on the shared radio frequency spectrum band, each time period of the plurality of time periods associated with a contention window duration, or a priority level, or a combination thereof, for a listen-before-talk procedure performed by the base station, a first time period of the plurality of time periods corresponding to a first operator and a second time period of the plurality of time periods corresponding to a second operator;

monitoring for downlink signals from the base station according to the determined plurality of time periods; and receiving a downlink signal from the base station during one or more of the plurality of time periods based at least in part on the monitoring.

23. The method of claim 22, wherein each time period of the plurality of time periods corresponds to a listen-before-talk priority class.

24. The method of claim 22, further comprising:

monitoring for periodic control signaling according to a control periodicity; and receiving control signals based at least in part on the monitoring.

25. An apparatus for wireless communications at a base station, comprising:

a processor, memory coupled with the processor; and instructions stored in the memory and executable by the processor to cause the apparatus to:

identify a listen-before-talk procedure to use to transmit a downlink signal to a user equipment (UE) on a shared radio frequency spectrum band, the listen-before-talk procedure comprising a type of listen-before-talk procedure that is one of a group listen-before-talk procedure associated with a first set of contention window durations or an individual listen-before-talk procedure associated with a second set of contention window durations;

determine a contention window duration corresponding to the type of listen-before-talk procedure that is the group listen-before-talk procedure;

perform the identified group listen-before-talk procedure using the determined contention window duration;

increase a common contention window duration by a predetermined factor after each failed group listen-before-talk procedure of a first plurality of consecutive failed group listen-before-talk procedures comprising the identified group listen-before-talk procedure until the common contention window duration is greater than or equal to a maximum contention window duration;

perform a second plurality of consecutive failed group listen-before-talk procedures until a number of consecutive failed group listen-before-talk procedures satisfies a threshold number of failed group listen-before-talk procedures;

reset the contention window duration based at least in part on the threshold number of failed group listen-before-talk procedures; and transmit the downlink signal to the UE on the shared radio frequency spectrum band based at least in part on one or more additional performed listen-before-talk procedures according to the reset contention window duration.

26. The apparatus of claim 25, wherein the instructions are further executable by the processor to cause the apparatus to:

identify a listen-before-talk priority class associated with the downlink signal, the contention window duration determined based at least in part on the identified listen-before-talk priority class.

27. The apparatus of claim 26, wherein each contention window duration of the first and second sets of contention window durations correspond to a respective listen-before-talk priority class of a plurality of listen-before-talk priority classes, and wherein the instructions are further executable by the processor to determine the contention window duration by being executable by the processor to:

select a contention window duration from one of the first set of contention window durations or the second set of contention window durations based at least in part on the identified group listen-before-talk procedure and the identified listen-before-talk priority class.

28. An apparatus for wireless communications at a user equipment (UE), comprising:

a processor, memory coupled with the processor; and instructions stored in the memory and executable by the processor to cause the apparatus to:

identify a common clock timing for a plurality of base stations communicating on a shared radio frequency spectrum band;

determine, based at least in part on the common clock timing for the plurality of base stations, a plurality of time periods for a base station of the plurality of base stations to transmit on the shared radio frequency spectrum band, each time period of the plurality of time periods associated with a contention window duration, or a priority level, or a combination thereof, for a listen-before-talk procedure performed by the base station, a first time period of the plurality of time periods corresponding to a first operator and a second time period of the plurality of time periods corresponding to a second operator;

monitor for downlink signals from the base station according to the determined plurality of time periods; and receive a downlink signal from the base station during one or more of the plurality of time periods based at least in part on based at least in part on the monitoring.

* * * * *